United States Patent
Lutnick

(10) Patent No.: US 11,227,292 B2
(45) Date of Patent: Jan. 18, 2022

(54) METHOD AND APPARATUS FOR GROUP FILTERED REPORTS

(71) Applicant: CFPH, LLC, New York, NY (US)

(72) Inventor: Howard W. Lutnick, New York, NY (US)

(73) Assignee: CFPH, LLC, New York, NY (US)

(*) Notice: Subject to any disclaimer, the term of this patent is extended or adjusted under 35 U.S.C. 154(b) by 0 days.

(21) Appl. No.: 16/209,473

(22) Filed: Dec. 4, 2018

(65) Prior Publication Data

US 2019/0180292 A1 Jun. 13, 2019

Related U.S. Application Data

(63) Continuation of application No. 15/675,017, filed on Aug. 11, 2017, now abandoned, which is a continuation of application No. 11/616,688, filed on Dec. 27, 2006, now abandoned.

(51) Int. Cl.
  *G06Q 10/00* (2012.01)
  *G06Q 30/02* (2012.01)
  *G06Q 10/10* (2012.01)

(52) U.S. Cl.
  CPC ............. *G06Q 30/02* (2013.01); *G06Q 10/10* (2013.01)

(58) Field of Classification Search
  CPC .............................. G06Q 30/02; G06Q 10/10
  See application file for complete search history.

(56) References Cited

U.S. PATENT DOCUMENTS

| | | | |
|---|---|---|---|
| 6,266,649 B1* | 7/2001 | Linden | G06Q 10/08345 705/14.51 |
| 6,321,221 B1* | 11/2001 | Bieganski | G06Q 30/02 705/26.7 |
| 6,389,372 B1* | 5/2002 | Glance | G06Q 30/02 702/189 |
| 6,662,231 B1* | 12/2003 | Drosset | H04L 63/10 709/229 |
| 6,832,240 B1 | 12/2004 | Dutta | |
| 11,616,735 | 12/2006 | Lutnick | |
| 11,616,748 | 12/2006 | Lutnick | |
| 11,616,756 | 12/2006 | Lutnick | |
| 7,349,871 B2 | 3/2008 | Labrou et al. | |
| 2003/0023499 A1* | 1/2003 | Das | G06Q 30/0613 705/26.3 |
| 2003/0154135 A1 | 8/2003 | Covington et al. | |
| 2005/0144052 A1* | 6/2005 | Harding | G06Q 10/087 705/26.1 |

(Continued)

OTHER PUBLICATIONS

International Search Report and Written Opinion for International Application No. PCT/US07/68883, dated Jun. 4, 2008 (8 pages).

(Continued)

*Primary Examiner* — Gabrielle A McCormick

(57) ABSTRACT

Systems and corresponding methods are provided that, in at least one embodiment, includes the act or acts of receiving a plurality of first representations; receiving a second representation of a first user; determining at least one group to which the first user belongs; determining at least one set of members of the at least one group; and filtering the plurality of first representations based, at least in part, on the at least one set of members. Each first representation represents a respective report.

10 Claims, 4 Drawing Sheets

(56) References Cited

U.S. PATENT DOCUMENTS

| | | | |
|---|---|---|---|
| 2005/0159998 A1* | 7/2005 | Buyukkokten | G06Q 30/02 705/319 |
| 2005/0171955 A1* | 8/2005 | Hull | H04L 51/12 |
| 2005/0256756 A1* | 11/2005 | Lam | G06Q 30/0202 705/7.33 |
| 2006/0085373 A1 | 4/2006 | Dhillion et al. | |
| 2006/0167757 A1 | 7/2006 | Holden et al. | |
| 2006/0173838 A1* | 8/2006 | Garg | G06Q 30/02 |
| 2006/0271281 A1* | 11/2006 | Ahn | G01C 21/26 701/532 |
| 2007/0203738 A1* | 8/2007 | Jaschke | G06Q 30/02 705/1.1 |
| 2007/0208613 A1* | 9/2007 | Backer | G06F 16/9535 715/234 |
| 2007/0226374 A1* | 9/2007 | Quarterman | G06Q 30/02 709/250 |
| 2007/0256093 A1* | 11/2007 | Hiler | H04N 21/47 725/28 |
| 2008/0162304 A1* | 7/2008 | Ourega | G06Q 10/08 705/26.4 |
| 2008/0195480 A1* | 8/2008 | Calabria | G06Q 30/0204 705/14.36 |

OTHER PUBLICATIONS

English, David, Site Selection—The three rules of retailing, location, coation, and location—extent to e-commerce; Computer Shopper, p. 1-4, Mar. 1, 2000.

U.S. PTO Office Action for U.S. Appl. No. 11/616,735; dated Feb. 23, 2010; 10 pages.

U.S. PTO Office Action for U.S. Appl. No. 11/616,748; dated Feb. 23, 2010; 8 pages.

U.S. PTO Office Action for U.S. Appl. No. 11/616,756; dated Feb. 23, 2010; 10 pages.

Rottentomatoes.com (http://web.archive.org/web/20050818023905/http://www.rottentomatoes.com/m/being_john_malkovich/.

Currier, Chet. "Navigate with more than rating's stars". Austin American Statesman. Austin, Tex.: Apr. 13, 1997. p. K.5.

\* cited by examiner

| ID | CONTENT | ORIGINATOR | TARGET |
|---|---|---|---|
| REPORT1 | "I LIKE THIS PRODUCT" | USER1 | PRODUCT1 |
| REPORT2 | RECOMMENDED | USER2 | SERVICE1 |
| REPORT3 | 7 POUNDS | USER3 | PRODUCT2 |
| REPORT4 | RATING1 | USER4 | PRODUCT1 |
| REPORT5 | NOT RECOMMENDED | USER5 | SERVICE1 |

FIGURE 3A

| ID | NAME | LOGIN | PASS-WORD | NET-WORKED USERS | CHARAC-TERISTICS | CHOSEN USERS |
|---|---|---|---|---|---|---|
| USER1 | "JANE" | LOGIN1 | PASS1 | USER4, USER3 | FEMALE, CHICAGO | NONE |
| USER2 | "JOHN" | LOGIN2 | PASS2 | NONE | MALE | NONE |
| USER3 | "CHRIS" | LOGIN3 | PASS3 | USER1 | NONE | NONE |
| USER4 | "SUSAN" | LOGIN4 | PASS4 | USER1 | DOCTOR, CHICAGO | NONE |
| USER5 | "STEVE" | LOGIN5 | PASS5 | NONE | NONE | USER1 |
| USER6 | "JIM" | LOGIN6 | PASS6 | NONE | MALE, DOCTOR, MARRIED | NONE |
| USER7 | "DIANE" | LOGIN7 | PASS7 | NONE | FEMALE, MARRIED | NONE |

FIGURE 3B

| ID | TYPE |
|---|---|
| PRODUCT1 | LAPTOP |
| PRODUCT2 | LAPTOP |
| SERVICE1 | DELIVERY SERVICE |

FIGURE 3C

METHOD AND APPARATUS FOR GROUP FILTERED REPORTS

CROSS REFERENCE TO RELATED APPLICATION

This application is a continuation of U.S. patent application Ser. No. 15/675,017 filed Aug. 11, 2017 which is a continuation of U.S. patent application Ser. No. 11/616,688 filed Dec. 27, 2006, which are hereby incorporated by reference herein in their entireties.

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled in every drawing. In the drawings:

FIGS. 3A-3C illustrate a set of database tables that may be used in accordance with some embodiments of the present invention.

DETAILED DESCRIPTION

Embodiments

Figure 1:
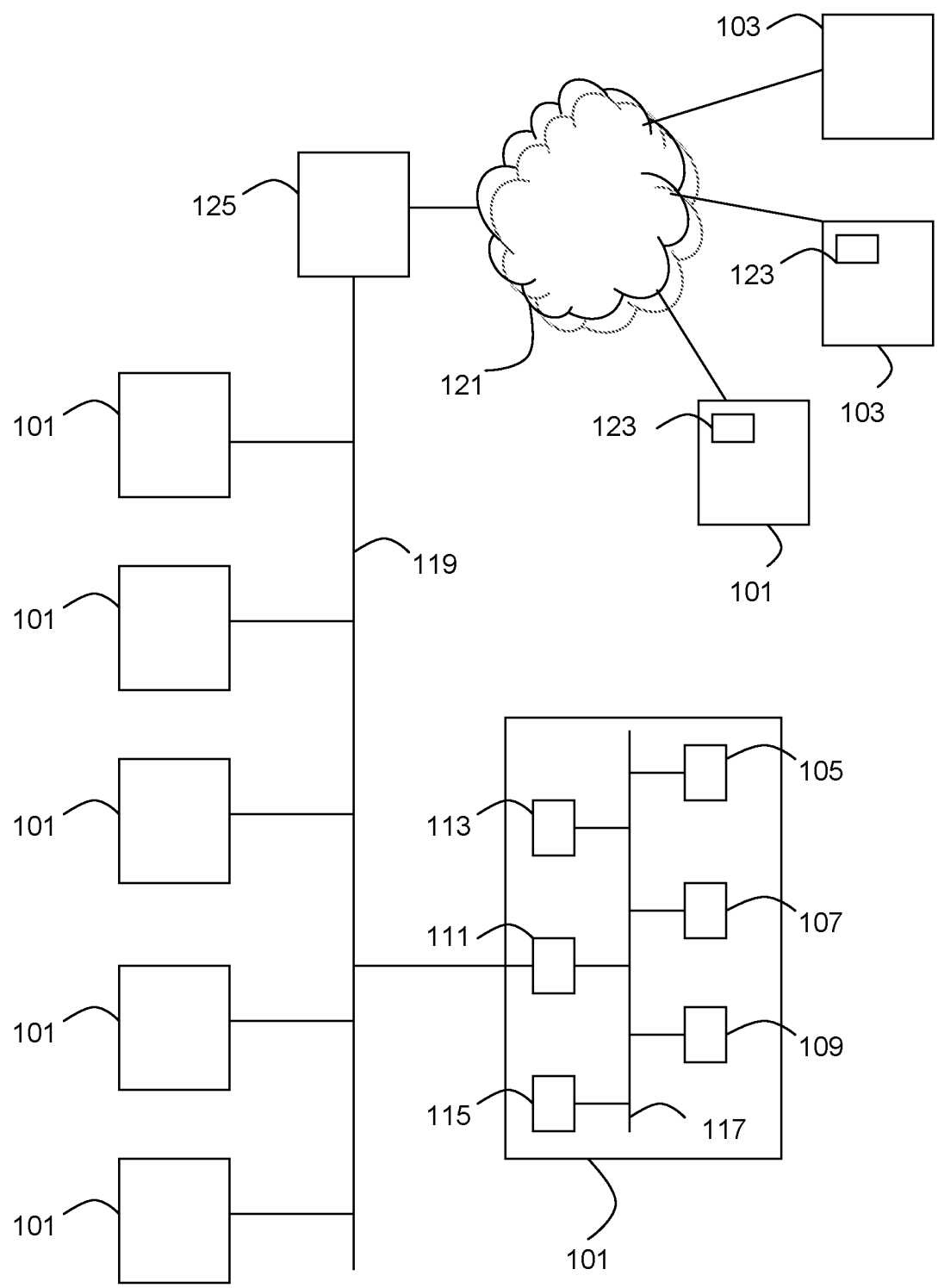
FIG. 1 illustrates a computer system architecture that may be used to perform one or more acts in accordance with some embodiments of the present invention.

Systems and corresponding methods are provided that, in at least one embodiment, includes the act or acts of receiving a plurality of first representations; receiving a second representation of a first user; determining at least one group to which the first user belongs; determining at least one set of members of the at least one group; and filtering the plurality of first representations based, at least in part, on the at least one set of members. Each first representation represents a respective report.

In one embodiment, each of the plurality of first representations further represents a respective originator of the report represented by the respective first representation. The filtering the plurality of first representations may include excluding from the plurality of first representations at least one first representation that represents a report that was not originated by at least one member of the at least one set of members. The filtering the plurality of first representations also may include excluding from the plurality of first representations at least one first representation that represents a negative report that was originated by at least one member of the at least one set of members.

In another embodiment, each of the plurality of first representations further represents at least one of a target and a target type and filtering includes excluding from the plurality of first representations at least one first representation that represents at least one of an undesired target and an undesired target type.

In yet another embodiment, at least one report represented by at least one first representation of the plurality of first representations includes at least one report on a service of a service provider. The service may include a delivery service.

Still another embodiment has at least one report represented by at least one first representation of the plurality of first representations includes at least one report on a product of a merchant.

In another embodiment, the at least one group includes a social network of the first user and the set of members includes the first user and at least one other member of the social network. The first user may include a customer of at least one of a merchant and a service provider. The first user also may include at least one of a merchant and a service provider.

In yet another embodiment, at least one member of the at least one group includes a reporter chosen by the first user. Still another embodiment has at least one group that includes at least one member having at least one desired characteristic. The at least one desired characteristic may include at least one of a profession, membership in an organization, and a geographic area.

In another embodiment, the system and methods further provide that, in at least one embodiment, includes the act or acts of transmitting at least one third representation of the filtered plurality of first representations.

In yet another embodiment, the system and methods further provide that, in at least one embodiment, includes the act or acts of presenting the filtered plurality of first representations to the first user. The act of presenting may include displaying the filtered plurality of first representations through a video display.

In an embodiment, the at least one second representation may include at least one of a name, an email address, a login name, a mailing address, a telephone number, and a user identifier.

In another embodiment, the system and methods further provide that, in at least one embodiment, includes the act or acts of making at least one recommendation to the first user based, at least in part, on the filtered plurality of first representations.

In another embodiment, the system and methods further provide that, in at least one embodiment, includes the act or acts of choosing at least one of a chosen product of a merchant and a chosen service of a service provider based, at least in part, on the filtered plurality of first representations.

In one embodiment, an apparatus includes a machine readable medium having stored thereon a plurality of machine instructions for controlling at least one computer system to perform a method provides that, in at least one embodiment, includes the act or acts of receiving a plurality of first representations; receiving a second representation of a first user; determining at least one group to which the first user belongs; determining at least one set of members of the at least one group; and filtering the plurality of first representations based, at least in part, on the at least one set of members. Each first representation represents a respective report. The apparatus may include a processor configured to execute at least one instruction of the plurality of machine instructions.

Some additional embodiments may include the following:

A method comprising: receiving a plurality of first representations, in which each first representation represents a respective report; receiving a second representation of a first user; determining at least one group to which the first user belongs; determining at least one set of members of the at least one group; and filtering the plurality of first representations based, at least in part, on the at least one set of members.

The method of paragraph 6, in which receiving the plurality of first representations includes receiving the plurality of first representations from a plurality of sources.

The method of paragraph 7, in which the plurality of sources includes at least one individual.

The method of paragraph 8, in which the at least one individual includes a user of at least one website.

The method of paragraph 7, in which the plurality of sources includes at least one collector of reports.

The method of paragraph 10, in which the at least one collector of reports includes at least one website.

The method of paragraph 6, in which the plurality of first representations includes at least one electronic message.

The method of paragraph 12, in which the at least one electronic message includes at least one of an email message, an HTTP message, a database message, an MMS message, and an SMS message.

The method of paragraph 6, in which the at least one second representation includes at least one electronic message.

The method of paragraph 14, in which the at least one electronic message includes at least one of an email message, an HTTP message, a database message, an MMS message, and an SMS message.

The method of paragraph 6, in which each of the plurality of first representations further represents an originator of the report represented by the respective first representation.

The method of paragraph 16, in which filtering the plurality of first representations includes excluding from the plurality of first representations at least one first representation that represents a report that was not originated by at least one member of the at least one set of members.

The method of paragraph 17, in which filtering the plurality of first representations includes excluding from the plurality of first representations each first representation that represents a report that was not originated by at least one member of the at least one set of members.

The method of paragraph 17, in which filtering the plurality of first representations includes excluding from the plurality of first representations at least one first representation that represents a negative report that was originated by at least one member of the at least one set of members.

The method of paragraph 19, in which each of the plurality of first representations further represents at least one of a respective target and a respective target type and filtering includes excluding from the plurality of first representations at least one first representation that represents at least one of an undesired target and an undesired target type.

The method of paragraph 6, in which each first representation of the plurality of first representations includes a representation of at least one of a respective target and a respective type of the respective report.

The method of paragraph 21, in which the respective includes at least one of a product, a merchant, a service, and a service provider and the respective type includes at least one of a type of product, a type of merchant, a type of service, and a type of service provider.

The method of paragraph 6, in which at least one report represented by least one first representation of the plurality of first representations includes an indication of at least one purchase.

The method of paragraph 6, in which at least one report represented by at least one first representation of the plurality of first representations includes at least one report on a service of a service provider.

The method of paragraph 24, in which the at least one report includes at least one of a review of the service, a rating of the service, a recommendation for the service, a recommendation against the service, and a fact regarding the service.

The method of paragraph 24, in which the service includes a delivery service.

The method of paragraph 26, in which the at least one report includes at least one of a time taken by the delivery service, a rating of the delivery service, a review of the delivery service, a recommendation for the delivery service, and a recommendation against the delivery service.

The method of paragraph 6, in which at least one report represented by at least one first representation of the plurality of first representations includes at least one report on a product of a merchant.

The method of paragraph 28, in which the at least one report includes at least one of a review of the product, a rating of the product, a recommendation for the product, a recommendation against the product, and a fact regarding the product.

The method of paragraph 6, in which the at least one group includes a social network of the first user and the set of members includes the first user and at least one other member of the social network.

The method of paragraph 30, in which the first user includes a customer of at least one of a merchant and a service provider.

The method of paragraph 30, in which the first user includes at least one of a merchant and a service provider.

The method of paragraph 30, further comprising: receiving a third representation of a potential member of the social network from at least one of the first user and the at least one other member of the social network; requesting an agreement to join the social network from the potential member; and adding the potential member to the social network if the potential member agrees to join the social network.

The method of paragraph 30, further comprising: receiving a third representation of a potential member of the social network from the potential member; requesting acceptance of the potential member from at least one of the first user and the at least one other member of the social network; and adding the potential member to the social network if the at least one of the first user and the at least one other member accepts the potential member.

The method of paragraph 30, in which each member of the social network is related to at least one of the first user and at least one other member of the social network.

The method of paragraph 35, in which each member of the social network is a friend of at least one of the first user and the at least one other member of the social network.

The method of paragraph 35, in which each member of the social network is a contact of at least one of the first user and the at least one other member of the social network.

The method of paragraph 35, in which each member of the social network is a colleague of at least one of the first user and the at least one other member of the social network.

The method of paragraph 6, in which at least one member of the at least one group includes a reporter chosen by the first user.

The method of paragraph 39, further comprising receiving a third representation of the reporter from the first user.

The method of paragraph 39, further comprising adding the chosen reporter to the at least one group.

The method of paragraph 39, in which the chosen reporter is at least one of a professional reporter, a celebrity, and a reporting organization.

The method of paragraph 6, in which the at least one group includes at least one member having at least one desired characteristic.

The method of paragraph 43, further comprising receiving at least one third representation of the desired characteristic from the first user.

The method of paragraph 44, in which the first user includes a customer of at least one of a merchant and a service provider.

The method of paragraph 44, in which the first user includes at least one of a merchant and a service provider.

The method of paragraph 44, in which the at least one third representation include at least one electronic message.

The method of paragraph 47, in which the at least one electronic message includes at least one of an HTTP message, a database message, a SMS message, a MMS message, and an email message.

The method of paragraph 43, in which the at least one desired characteristic includes a geographic area.

The method of paragraph 49, in which the geographic area includes at least one of a geographic area in which the first user lives and a geographic area of a place of business of the first user.

The method of paragraph 43, in which the at least one desired characteristic includes a profession.

The method of paragraph 51, in which the profession includes a first profession in which the first user works.

The method of paragraph 43, in which the at least one desired characteristic includes membership in an organization.

The method of paragraph 53, in which the first user is a member of the organization.

The method of paragraph 6, further comprising transmitting at least one third representation of the filtered plurality of first representations.

The method of paragraph 55, in which the at least one third representation includes at least one interface through which the filtered plurality of first representations may be viewed.

The method of paragraph 56, in which the at least one interface includes at least one of a website, a mobile device interface, and an email message.

The method of paragraph 55, in which the at least one third representation includes an electronic message.

The method of paragraph 58, in which the electronic message includes at least one of an HTTP message, a database message, a SMS message, a MMS message, and an email message.

The method of paragraph 6, further comprising presenting the filtered plurality of first representations to the first user.

The method of paragraph 60, in which presenting includes displaying the filtered plurality of first representations through a video display.

The method of paragraph 6, in the at least one second representation includes at least one of a name, an email address, a login name, a mailing address, a telephone number, and a user identifier.

The method of paragraph 6, further comprising making at least one recommendation to the first user based, at least in part, on the filtered plurality of first representations.

The method of paragraph 63, in which the at least one recommendation includes a first recommendation for at least one of a product of a merchant and a service of a service provider, and in which at least one first report represented by at least one representation of the filtered plurality of first representations is a report on the at least one of the product and the service.

The method of paragraph 64, in which the at least one first report includes a positive report.

The method of paragraph 64, in which the at least one first report includes a high rating of the at least one of the product and the service.

The method of paragraph 66, in which the high rating includes at least one first rating that is higher than at least one second rating given to at least one of a non-recommended product and a non-recommended service by at least one second report represented by at least one other representation of the plurality of first representations.

The method of paragraph 63, in which making the at least one recommendation includes presenting at least one third representation of at least one of a product and a service to the first user.

The method of paragraph 68, in which presenting includes displaying the at least one third representation through a user interface.

The method of paragraph 68, in which presenting includes displaying the at least one third representations through a video display.

The method of paragraph 6, further comprising choosing at least one of a chosen product of a merchant and a chosen service of a service provider based, at least in part, on the filtered plurality of first representations.

The method of paragraph 71, in which at least one first report represented by at least one representation of the filtered plurality of first representations is a report on the at least one of the chosen product and the chosen service.

The method of paragraph 72, in which the at least one first report includes a positive report.

The method of paragraph 72, in which the at least one first report includes a high rating of the at least one of the chosen product and the chosen service.

The method of paragraph 74, in which the high rating includes at least one first rating that is higher than at least one second rating given to at least one of a non-chosen product and a non-chosen service by at least one second report represented by at least one other representation of the plurality of first representations.

An apparatus comprising: a machine readable medium having stored thereon a plurality of machine instructions for controlling at least one computer system to perform a method according to paragraph 1.

The apparatus of paragraph 76, further comprising: a processor configured to execute at least one instruction of the plurality of machine instructions.

A method comprising: receiving a plurality of first representations, in which each first representation represents a respective report; receiving at least one second representation of at least one group; and filtering the plurality of first representations based, at least in part, on the at least one second representation.

The method of paragraph 78, in which receiving the plurality of first representations includes receiving the plurality of first representations from a plurality of sources.

The method of paragraph 79, in which the plurality of sources includes at least one individual.

The method of paragraph 80, in which the at least one individual includes a user of at least one website.

The method of paragraph 79, in which the plurality of sources includes at least one collector of reports.

The method of paragraph 82, in which the at least one collector of reports includes at least one website.

The method of paragraph 78, in which the plurality of first representations includes at least one electronic message.

The method of paragraph 84, in which the at least one electronic message includes at least one of an email message, an HTTP message, a database message, an MMS message, and an SMS message.

The method of paragraph 78, in which the at least one second representation includes at least one electronic message.

The method of paragraph 86, in which the at least one electronic message includes at least one of an email message, an HTTP message, a database message, an MMS message, and an SMS message.

The method of paragraph 78, in which each of the plurality of first representations further represents an originator of the report represented by the respective first representation.

The method of paragraph 88, in which filtering the plurality of first representations includes excluding from the plurality of first representations at least one first representation that represents a report that was not originated by at least one member of the at least one group.

The method of paragraph 89, in which filtering the plurality of first representations includes excluding from the plurality of first representations each first representation that represents a report that was not originated by at least one member of the at least one group.

The method of paragraph 89, in which filtering the plurality of first representations includes excluding from the plurality of first representations at least one first representation that represents a negative report that was originated by at least one member of the at least one group.

The method of paragraph 91, in which each of the plurality of first representations further represents at least one of a respective target and a respective target type and filtering includes excluding from the plurality of first representations at least one first representation that represents at least one of an undesired target and an undesired target type.

The method of paragraph 78, in which each first representation of the plurality of first representations includes a representation of at least one of a respective target and a respective type of the respective report.

The method of paragraph 93, in which the respective includes at least one of a product, a merchant, a service, and a service provider and the respective type includes at least one of a type of product, a type of merchant, a type of service, and a type of service provider.

The method of paragraph 78, in which at least one report represented by least one first representation of the plurality of first representations includes an indication of at least one purchase.

The method of paragraph 78, in which at least one report represented by at least one first representation of the plurality of first representations includes at least one report on a service of a service provider.

The method of paragraph 96, in which the at least one report includes at least one of a review of the service, a rating of the service, a recommendation for the service, a recommendation against the service, and a fact regarding the service.

The method of paragraph 96, in which the service includes a delivery service.

The method of paragraph 98, in which the at least one report includes at least one of a time taken by the delivery service, a rating of the delivery service, a review of the delivery service, a recommendation for the delivery service, and a recommendation against the delivery service.

The method of paragraph 78, in which at least one report represented by at least one first representation of the plurality of first representations includes at least one report on a product of a merchant.

The method of paragraph 100, in which the at least one report includes at least one of a review of the product, a rating of the product, a recommendation for the product, a recommendation against the product, and a fact regarding the product.

The method of paragraph 78, in which the at least one group includes at least one social network of at least one user.

The method of paragraph 102, in which the at least one user includes a customer of at least one of a merchant and a service provider.

The method of paragraph 102, in which the at least one user includes at least one of a merchant and a service provider.

The method of paragraph 102, further comprising: receiving a third representation of a potential member of the at least one social network from at least one of the at least one user and at least one other member of the at least one social network; requesting an agreement to join the social network from the potential member; and adding the potential member to the social network if the potential member agrees to join the at least one social network.

The method of paragraph 102, further comprising: receiving a third representation of a potential member of the at least one social network from the potential member; requesting acceptance of the potential member from at least one of the at least one user and at least one other member of the at least one social network; and adding the potential member to the at least one social network if the at least one of the at least one user and the at least one other member accepts the potential member.

The method of paragraph 102, in which each member of the social network is related to at least one of the at least one user and at least one other member of the at least one social network.

The method of paragraph 107, in which each member of the social network is a friend of at least one of the at least one user and another member of the at least one social network.

The method of paragraph 107, in which each member of the social network is a contact of at least one of the at least one user and another member of the at least one social network.

The method of paragraph 107, in which each member of the social network is a colleague of at least one of the at least one user and another member of the at least one social network.

The method of paragraph 78, in which at least one member of the at least one group includes a reporter chosen by at least one user.

The method of paragraph 111, further comprising receiving a third representation of the reporter from the at least one user.

The method of paragraph 112, further comprising adding the chosen reporter to the at least one group.

The method of paragraph 112, in which the chosen reporter is at least one of a professional reporter, a celebrity, and a reporting organization.

The method of paragraph 78, in which the at least one group includes at least one member having at least one desired characteristic.

The method of paragraph 115, further comprising receiving at least one third representation of the desired characteristic from at least one user.

The method of paragraph 116, in which the at least one second representation is received from the at least one user.

The method of paragraph 116, in which the at least one user includes a customer of at least one of a merchant and a service provider.

The method of paragraph 116, in which the at least one user includes at least one of a merchant and a service provider.

The method of paragraph 116, in which the at least one third representation include at least one electronic message.

The method of paragraph 120, in which the at least one electronic message includes at least one of an HTTP message, a database message, a SMS message, a MMS message, and an email message.

The method of paragraph 115, in which the at least one desired characteristic includes a geographic area.

The method of paragraph 122, in which the geographic area includes at least one of a geographic area in which the at least one user lives and a geographic area of a place of business of the at least one user.

The method of paragraph 115, in which the at least one desired characteristic includes a profession.

The method of paragraph 124, in which the profession includes a first profession in which the at least one user works.

The method of paragraph 115, in which the at least one desired characteristic includes membership in an organization.

The method of paragraph 126, in which the at least one user is a member of the organization.

The method of paragraph 78, further comprising transmitting at least one third representation of the filtered plurality of first representations.

The method of paragraph 128, in which the at least one third representation includes at least one interface through which a user may view the filtered plurality of first representations.

The method of paragraph 129, in which the at least one interface includes at least one of a website, a mobile device interface, and an email message.

The method of paragraph 129, in which the at least one third representation includes an electronic message.

The method of paragraph 131, in which the electronic message includes at least one of an HTTP message, a database message, a SMS message, a MMS message, and an email message.

The method of paragraph 78, further comprising presenting the filtered plurality of first representations to at least one user.

The method of paragraph 133, in which presenting includes displaying the filtered plurality of first representations through a video display.

The method of paragraph 78, in which the at least one second representation includes a representation of at least one member of the group.

The method of paragraph 78, in which the at least one second representation includes a contact list.

The method of paragraph 136, in which the at least one group includes at least one contact of the contact list.

The method of paragraph 136, in which the contact list includes at least one email contact list.

The method of paragraph 78, in which for at least one member of the at least one group, the at least one second representation includes at least one of a name, an email address, a login name, a mailing address, a telephone number, and a user identifier.

The method of paragraph 78, further comprising making at least one recommendation to a user based, at least in part, on the filtered plurality of first representations.

The method of paragraph 140, in which the at least one recommendation includes a first recommendation for at least one of a product of a merchant and a service of a service provider, and in which at least one first report represented by at least one representation of the filtered plurality of first representations is a report on the at least one of the product and the service.

The method of paragraph 141, in which the at least one first report includes a positive report.

The method of paragraph 141, in which the at least one first report includes a high rating of the at least one of the product and the service.

The method of paragraph 143, in which the high rating includes at least one first rating that is higher than at least one second rating given to at least one of a non-recommended product and a non-recommended service by at least one second report represented by at least one other representation of the plurality of first representations.

The method of paragraph 140, in which making the at least one recommendation includes presenting at least one third representation of at least one of a product and a service to the user.

The method of paragraph 145, in which presenting includes displaying the at least one third representation through a user interface.

The method of paragraph 145, in which presenting includes displaying the at least one third representations through a video display.

The method of paragraph 78, further comprising choosing at least one of a chosen product of a merchant and a chosen service of a service provider based, at least in part, on the filtered plurality of first representations.

The method of paragraph 148, in which at least one first report represented by at least one representation of the filtered plurality of first representations is a report on the at least one of the chosen product and the chosen service.

The method of paragraph 149, in which the at least one first report includes a positive report.

The method of paragraph 149, in which the at least one first report includes a high rating of the at least one of the chosen product and the chosen service.

The method of paragraph 151, in which the high rating includes at least one first rating that is higher than at least one second rating given to at least one of a non-chosen product and a non-chosen service by at least one second report represented by at least one other representation of the plurality of first representations.

An apparatus comprising: a machine readable medium having stored thereon a plurality of machine instructions for controlling at least one computer system to perform a method according to paragraph 78.

The apparatus of paragraph 153, further comprising: a processor configured to execute at least one instruction of the plurality of machine instructions.

A method comprising: receiving a plurality of first representations, in which each first representation represents a respective report and an originator of the report; and responding to a request from a user by providing the user at least one second representation of at least one subset of the plurality of first representations, in which the at least one subset does not include at least one first representation that represents an originator that is not a member of at least one group.

The method of paragraph 155, in which the at least one subset does not include at least one first representation that represents an originator that is a member of the at least one group and that represents a negative report.

The method of paragraph 155, in which the at least one subset does not include any first representations that represent an originator that is not a member of the at least one group.

The method of paragraph 157, in which the at least one subset does not include any first representation that represents an originator that is a member of the at least one group and that represents a negative report.

The method of paragraph 155, in which receiving the plurality of first representations includes receiving the plurality of first representations from a plurality of sources.

The method of paragraph 159, in which the plurality of sources includes at least one individual.

The method of paragraph 160, in which the at least one individual includes at least one user of at least one website.

The method of paragraph 159, in which the plurality of sources includes at least one collector of reports.

The method of paragraph 159, in which the at least one collector of reports includes at least one website.

The method of paragraph 155, in which the plurality of first representations includes at least one electronic message.

The method of paragraph 164, in which the electronic message includes at least one of an email message, an HTTP message, a database message, an MMS message, and an SMS message.

The method of paragraph 155, in which the at least one request includes an electronic message.

The method of paragraph 166, in which the electronic message includes at least one of an email message, an HTTP message, a database message, an MMS message, and an SMS message.

The method of paragraph 155, in which each first representation of the plurality of first representations includes a representation of at least one of a respective target and a respective type of the respective report.

The method of paragraph 168, in which the at least one subset does not include at least one first representation that represents at least one of an undesired target and an undesired target type.

The method of paragraph 155, in which at least one first representation of the plurality of first representations represents an indication of at last one purchase.

The method of paragraph 155, in which at least one report represented by at least one first representation of the plurality of first representations includes at least one report on a service of a service provider.

The method of paragraph 171, in which the at least one report includes at least one rating of the service, review of the service, a recommendation for the service, a recommendation against the service, and a fact regarding the service.

The method of paragraph 171, in which the service includes a delivery service.

The method of paragraph 173, in which the at least one report includes at least one of a time taken by the delivery service, a rating of the delivery service, a review of the delivery service, a recommendation for the delivery service, and a recommendation against the delivery service.

The method of paragraph 155, in which at least one report represented by at least one first representation of the plurality of first representations includes at least one report on a product of a merchant.

The method of paragraph 175, in which the at least one report includes at least one of a review of the product, a rating of the product, a recommendation for the product, a recommendation against the product, and a fact regarding the product.

The method of paragraph 155, in which the at least one group includes a social network of an entity.

The method of paragraph 177, in which the entity includes the user.

The method of paragraph 178, in which the user includes at least one of a merchant and a service provider.

The method of paragraph 178, in which the user includes a customer of at least one of a merchant and a service provider.

The method of paragraph 177, further comprising: receiving a third representation of a potential member of the social network from at least one of the entity and another member of the social network; requesting an agreement to join the social network from the potential member; and adding the potential member to the social network if the potential member agrees to join the social network.

The method of paragraph 177, further comprising: receiving a third representation of a potential member of the social network from the potential member; requesting acceptance of the potential member from at least one of the entity and another member of the social network; and adding the potential member to the social network if the at least one of the entity and the other member of the social network accepts the potential member.

The method of paragraph 177, in which each member of the social network is related to at least one of the entity and another member of the social network.

The method of paragraph 183, in which each member of the social network is a friend of at least one of the entity and another member of the social network.

The method of paragraph 183, in which each member of the social network is a contact of at least one of the entity and another member of the social network.

The method of paragraph 183, in which each member of the social network is a colleague of at least one of the entity and another member of the social network.

The method of paragraph 155, in which the at least one group includes a reporter chosen by the user.

The method of paragraph 187, further comprising receiving a third representation of the chosen reporter from the user.

The method of paragraph 188, further comprising adding the chosen reviewer to the at least one group.

The method of paragraph 188, in which the chosen reviewer is at least one of a professional reporter, a celebrity, and a reporting organization.

The method of paragraph 155, in which the at least one group includes at least one first member having at least one desired characteristic.

The method of paragraph 191, in which the at least one desired characteristic includes a geographic area.

The method of paragraph 192, in which the geographic area includes a geographic area in which the user lives and a geographic area of a place of business of the user.

The method of paragraph 191, in which the at least one desired characteristic includes a profession.

The method of paragraph 194, in which the profession includes a first profession in which the user works.

The method of paragraph 191, in which the at least one desired characteristic includes membership in an organization.

The method of paragraph 196, in which the uses is a member of the organization.

The method of paragraph 191, further comprising receiving at least one third representation of the desired characteristic from the user.

The method of paragraph 198, in which the at least one third representation includes at least one electronic message.

The method of paragraph 199 in which the at least one electronic message includes at least one of an HTTP message, a database message, a SMS message, a MMS message, and an email message.

The method of paragraph 155, in which providing the users the at least one second representation includes transmitting the at least one second representation to the user.

The method of paragraph 201, in which the at least one second representation includes at least one electronic message.

The method of paragraph 202, in which the at least one electronic message includes at least one of an HTTP message, an email, a database message, a SMS message, and a MMS message.

The method of paragraph 155, in which providing the users the at least one second representation includes displaying the at least one second representation through at least one interface.

The method of paragraph 204, in which the at least one interface includes at least one of a website, a mobile device interface, and an email.

The method of paragraph 155, in which the at least one group includes at least one contact from a contact list of the user.

The method of paragraph 206, in which the contact list includes at least one email contact list.

The method of paragraph 155, further comprising receiving at least one third representation of the at least one group from the user.

The method of paragraph 208, in which for at least one member of the at least one group, the at least one third representation includes at least one of a name, an email address, a login name, a mailing address, a telephone number, and a user identifier.

The method of paragraph 155, further comprising expanding the at least one group.

The method of paragraph 155, in which responding to the request includes making at least one recommendation based, at least in part, on the at least one subset of the plurality of first representations.

The method of paragraph 211, in which the at least one recommendation includes a first recommendation or at least one of a recommended product of merchant and a recommended service of a service provider, and in which at least one first report represented by at least one of the at least one subset of the plurality of first representations is a report on the at least one of the recommended product and the recommended service.

The method of paragraph 212, in which the at least one report includes a positive report.

The method of paragraph 212, in which the at least one first report includes a high rating of the at least one of the recommended product and the recommended service.

The method of paragraph 214, in which the high rating includes at least one first rating that is higher than at least one second rating given to at least one of a non-recommended product and a non-recommended service by at least one second report represented by at least one other representation of the plurality of first representations.

The method of paragraph 211, in which making the at least one recommendation includes presenting at least one third representation of the at least one of the recommended product and the recommended service to the user.

The method of paragraph 216, in which presenting includes displaying the at least one third recommendation through a user interface.

The method of paragraph 216, in which presenting includes displaying the at least one third representation through a video display.

The method of paragraph 155, in which responding to the request includes choosing at least one of a product of a chosen merchant and a chosen service of a service provider based, at least in part, on the subset of the plurality of first representations.

The method of paragraph 219, in which at least one first report represented by at least one representation of the subset of the plurality of first representations includes a report on the at least one of the chosen product and the chosen service.

The method of paragraph 220, in which the at least one first report includes a positive report.

The method of paragraph 220, in which the at least one first report includes a high rating of the at least one of the chosen product and the chosen service.

The method of paragraph 222, in which the high rating includes at least one first rating that is higher than at least one second rating given to at least one of a non-chosen product and a non-chosen service by at least one second report representation by at least one other representation of the plurality of first representations.

An apparatus comprising: a machine readable medium having stored thereon a plurality of machine instructions for controlling at least one computer system to perform a method according to paragraph 155.

The apparatus of paragraph 224, further comprising: A processor configured to execute at least one instruction of the plurality of machine instructions.

An apparatus comprising: an first element configured to receiving a plurality of first representations, in which each first representation represents a report, and further configured to receive a second representation of a first user; and a second element configured to determine at least one group to which the first user belongs, configured to determine at least one set of members of the at least one group, and configured to filter the plurality of first representations based, at least in part, on the at least one set of members.

The apparatus of paragraph 226, in which the first element is configured to receive the plurality of first representations from a plurality of sources.

The apparatus of paragraph 227, in which the plurality of sources includes at least one individual.

The apparatus of paragraph 228, in which the at least one individual includes a user of at least one website.

The apparatus of paragraph 227, in which the plurality of sources includes at least one collector of reports.

The apparatus of paragraph 230, in which the at least one collector of reports includes at least one website.

The apparatus of paragraph 226, in which the plurality of first representations includes at least one electronic message.

The apparatus of paragraph 232, in which the at least one electronic message includes at least one of an email message, an HTTP message, a database message, an MMS message, and an SMS message.

The apparatus of paragraph 226, in which the at least one second representation includes at least one electronic message.

The apparatus of paragraph 234, in which the at least one electronic message includes at least one of an email message, an HTTP message, a database message, an MMS message, and an SMS message.

The apparatus of paragraph 226, in which each of the plurality of first representations further represents an originator of the report represented by the respective first representation.

The apparatus of paragraph 236, in which the second element is configured to exclude from the plurality of first representations at least one first representation that represents a report that was not originated by at least one member of the at least one set of members.

The apparatus of paragraph 237, in which the second element is configured to exclude from the plurality of first representations each first representation that represents a report that was not originated by at least one member of the at least one set of members.

The apparatus of paragraph 237, in which the second element is configured to exclude from the plurality of first representations at least one first representation that represents a negative report that was originated by at least one member of the at least one set of members.

The apparatus of paragraph 239, in which each of the plurality of first representations further represents at least one of a respective target and a respective target type and filtering includes excluding from the plurality of first representations at least one first representation that represents at least one of an undesired target and an undesired target type.

The apparatus of paragraph 226, in which each first representation of the plurality of first representations includes a representation of at least one of a respective target and a respective type of the respective report.

The apparatus of paragraph 241, in which the respective includes at least one of a product, a merchant, a service, and a service provider and the respective type includes at least one of a type of product, a type of merchant, a type of service, and a type of service provider.

The apparatus of paragraph 226, in which at least one report represented by least one first representation of the plurality of first representations includes an indication of at least one purchase.

The apparatus of paragraph 226, in which at least one report represented by at least one first representation of the plurality of first representations includes at least one report on a service of a service provider.

The apparatus of paragraph 244, in which the at least one report includes at least one of a review of the service, a rating of the service, a recommendation for the service, a recommendation against the service, and a fact regarding the service.

The apparatus of paragraph 244, in which the service includes a delivery service.

The apparatus of paragraph 246, in which the at least one report includes at least one of a time taken by the delivery service, a rating of the delivery service, a review of the delivery service, a recommendation for the delivery service, and a recommendation against the delivery service.

The apparatus of paragraph 226, in which at least one report represented by at least one first representation of the plurality of first representations includes at least one report on a product of a merchant.

The apparatus of paragraph 248, in which the at least one report includes at least one of a review of the product, a rating of the product, a recommendation for the product, a recommendation against the product, and a fact regarding the product.

The apparatus of paragraph 226, in which the second element is configured to determine at least one social network to which the first user and the set of members belong.

The apparatus of paragraph 250, in which the first user includes a customer of at least one of a merchant and a service provider.

The apparatus of paragraph 250, in which the first user includes at least one of a merchant and a service provider.

The apparatus of paragraph 250, in which the first element is configured to receive a third representation of a potential member of the social network from at least one of the first user and at least one other member of the social network, is configured to transmit a request for an agreement to join the social network from the potential member; and is configured to receive a response to the request for an agreement; and the second element is configured to add the potential member to the social network if the potential member agrees to join the social network.

The apparatus of paragraph 250, in which the first element is configured to receive a third representation of a potential member of the social network from the potential member, is configured to transmit a request for acceptance of the potential member to at least one of the first user and at least one other member of the social network, and is configure to receive a response to the request for acceptance; and the second element is configured to add the potential member to the social network if the at least one of the first user and the at least one other member accepts the potential member.

The apparatus of paragraph 250, in which each member of the social network is related to at least one of the first user and at least one other member of the social network.

The apparatus of paragraph 255, in which each member of the social network is a friend of at least one of the first user and the at least one other member of the social network.

The apparatus of paragraph 255, in which each member of the social network is a contact of at least one of the first user and the at least one other member of the social network.

The apparatus of paragraph 255, in which each member of the social network is a colleague of at least one of the first user and the at least one other member of the social network.

The apparatus of paragraph 226, in which at least one member of the at least one group includes a reporter chosen by the first user.

The apparatus of paragraph 259, in which the first element is further configured to receive a third representation of the reporter from the first user.

The apparatus of paragraph 260, in which the second element is further configured to add the chosen reporter to the at least one group.

The apparatus of paragraph 260, in which the chosen reporter is at least one of a professional reporter, a celebrity, and a reporting organization.

The apparatus of paragraph 226, in which the at least one group includes at least one member having at least one desired characteristic.

The apparatus of paragraph 263, in which the first element is configured to receive at least one third representation of the desired characteristic from the first user.

The apparatus of paragraph 264, in which the first user includes a customer of at least one of a merchant and a service provider.

The apparatus of paragraph 264, in which the first user includes at least one of a merchant and a service provider.

The apparatus of paragraph 263, in which the at least one desired characteristic includes a geographic area.

The apparatus of paragraph 267, in which the geographic area includes at least one of a geographic area in which the first user lives and a geographic area of a place of business of the first user.

The apparatus of paragraph 263, in which the at least one desired characteristic includes a profession.

The apparatus of paragraph 269, in which the profession includes a first profession in which the first user works.

The apparatus of paragraph 263, in which the at least one desired characteristic includes membership in an organization.

The apparatus of paragraph 271, in which the first user is a member of the organization.

The apparatus of paragraph 263, in which the at least one third representation include at least one electronic message.

The apparatus of paragraph 273, in which the at least one electronic message includes at least one of an HTTP message, a database message, a SMS message, a MMS message, and an email message.

The apparatus of paragraph 226, in which the second element is configured to transmit at least one third representation of the filtered plurality of first representations.

The apparatus of paragraph 275, in which the at least one third representation includes at least one interface through which the filtered plurality of first representations may be viewed.

The apparatus of paragraph 276, in which the at least one interface includes at least one of a website, a mobile device interface, and an email message.

The apparatus of paragraph 275, in which the at least one third representation includes an electronic message.

The apparatus of paragraph 278, in which the electronic message includes at least one of an HTTP message, a database message, a SMS message, a MMS message, and an email message.

The apparatus of paragraph 226, in the at least one second representation includes at least one of a name, an email address, a login name, a mailing address, a telephone number, and a user identifier.

The apparatus of paragraph 226, in which the second element is configured to generate at least one recommendation based, at least in part, on the filtered plurality of first representations.

The apparatus of paragraph 281, in which the at least one recommendation includes a first recommendation for at least one of a product of a merchant and a service of a service provider, and in which at least one first report represented by at least one representation of the filtered plurality of first representations is a report on the at least one of the product and the service.

The apparatus of paragraph 282, in which the at least one first report includes a positive report.

The apparatus of paragraph 282, in which the at least one first report includes a high rating of the at least one of the product and the service.

The apparatus of paragraph 284, in which the high rating includes at least one first rating that is higher than at least one second rating given to at least one of a non-recommended product and a non-recommended service by at least one second report represented by at least one other representation of the plurality of first representations.

The apparatus of paragraph 281, in which the at least one first element is configured to transmit a at least one third representation of the recommendation to the first user.

The apparatus of paragraph 226, in which the second element is further configured to choose at least one of a chosen product of a merchant and a chosen service of a service provider based, at least in part, on the filtered plurality of first representations.

The apparatus of paragraph 287, in which at least one first report represented by at least one representation of the filtered plurality of first representations is a report on the at least one of the chosen product and the chosen service.

The apparatus of paragraph 288, in which the at least one first report includes a positive report.

The apparatus of paragraph 288, in which the at least one first report includes a high rating of the at least one of the chosen product and the chosen service.

The apparatus of paragraph 290, in which the high rating includes at least one first rating that is higher than at least one second rating given to at least one of a non-chosen product and a non-chosen service by at least one second report represented by at least one other representation of the plurality of first representations.

The apparatus of paragraph 226, in which the first element includes at least one input/output device and the second element includes at least one processor.

An apparatus comprising: at least one first element configured to receive at least one first representation of at least one group and further configured to receive a plurality of second representations, in which each second representation represents a report; and at least one second element configured to filter the plurality of second representations based, at least in part, on the at least one group.

The apparatus of paragraph 293, in which the first element is configured to receive the plurality of first representations from a plurality of sources.

The apparatus of paragraph 294, in which the plurality of sources includes at least one individual.

The apparatus of paragraph 295, in which the at least one individual includes a user of at least one website.

The apparatus of paragraph 294, in which the plurality of sources includes at least one collector of reports.

The apparatus of paragraph 297, in which the at least one collector of reports includes at least one website.

The apparatus of paragraph 293, in which the plurality of first representations includes at least one electronic message.

The apparatus of paragraph 299, in which the at least one electronic message includes at least one of an email message, an HTTP message, a database message, an MMS message, and an SMS message.

The apparatus of paragraph 293, in which the at least one second representation includes at least one electronic message.

The apparatus of paragraph 301, in which the at least one electronic message includes at least one of an email message, an HTTP message, a database message, an MMS message, and an SMS message.

The apparatus of paragraph 293, in which each of the plurality of first representations further represents an originator of the report represented by the respective first representation.

The apparatus of paragraph 303, in which the second element is configured to exclude from the plurality of first representations at least one first representation that represents a report that was not originated by at least one member of the at least one group.

The apparatus of paragraph 304, in which the second element is configured to exclude from the plurality of first representations each first representation that represents a report that was not originated by at least one member of the at least one group.

The apparatus of paragraph 304, in which the second element is configured to exclude from the plurality of first representations at least one first representation that represents a negative report that was originated by at least one member of the at least one group.

The apparatus of paragraph 306, in which each of the plurality of first representations further represents at least one of a respective target and a respective target type and filtering includes excluding from the plurality of first representations at least one first representation that represents at least one of an undesired target and an undesired target type.

The apparatus of paragraph 293, in which each first representation of the plurality of first representations includes a representation of at least one of a respective target and a respective type of the respective report.

The apparatus of paragraph 308, in which the respective includes at least one of a product, a merchant, a service, and a service provider and the respective type includes at least one of a type of product, a type of merchant, a type of service, and a type of service provider.

The apparatus of paragraph 293, in which at least one report represented by least one first representation of the plurality of first representations includes an indication of at least one purchase.

The apparatus of paragraph 293, in which at least one report represented by at least one first representation of the plurality of first representations includes at least one report on a service of a service provider.

The apparatus of paragraph 311, in which the at least one report includes at least one of a review of the service, a rating of the service, a recommendation for the service, a recommendation against the service, and a fact regarding the service.

The apparatus of paragraph 311, in which the service includes a delivery service.

The apparatus of paragraph 313, in which the at least one report includes at least one of a time taken by the delivery service, a rating of the delivery service, a review of the delivery service, a recommendation for the delivery service, and a recommendation against the delivery service.

The apparatus of paragraph 293, in which at least one report represented by at least one first representation of the plurality of first representations includes at least one report on a product of a merchant.

The apparatus of paragraph 315, in which the at least one report includes at least one of a review of the product, a rating of the product, a recommendation for the product, a recommendation against the product, and a fact regarding the product.

The apparatus of paragraph 293, in which the at least one group includes at least one social network of at least one user.

The apparatus of paragraph 317, in which the at least one user includes a customer of at least one of a merchant and a service provider.

The apparatus of paragraph 317, in which the at least one user includes at least one of a merchant and a service provider.

The apparatus of paragraph 317, in which the first element is configured to receive a third representation of a potential member of the social network from at least one of the at least one user and at least one other member of the social network, is configured to transmit a request for an agreement to join the social network from the potential member; and is configured to receive a response to the request for an agreement; and the second element is configured to add the potential member to the social network if the potential member agrees to join the social network.

The apparatus of paragraph 317, in which the first element is configured to receive a third representation of a potential member of the social network from the potential member, is configured to transmit a request for acceptance of the potential member to at least one of the at least one user and at least one other member of the social network, and is configure to receive a response to the request for acceptance; and the second element is configured to add the potential member to the social network if the at least one of the at least one user and the at least one other member accepts the potential member.

The apparatus of paragraph 317, in which each member of the social network is related to at least one of the at least one user and at least one other member of the at least one social network.

The apparatus of paragraph 322, in which each member of the social network is a friend of at least one of the at least one user and another member of the at least one social network.

The apparatus of paragraph 322, in which each member of the social network is a contact of at least one of the at least one user and another member of the at least one social network.

The apparatus of paragraph 322, in which each member of the social network is a colleague of at least one of the at least one user and another member of the at least one social network.

The apparatus of paragraph 293, in which at least one member of the at least one group includes a reporter chosen by at least one user.

The apparatus of paragraph 326, in which the first element is configured to receive a third representation of the reporter from the at least one user.

The apparatus of paragraph 327, in which the second element is configured to add the chosen reporter to the at least one group.

The apparatus of paragraph 327, in which the chosen reporter is at least one of a professional reporter, a celebrity, and a reporting organization.

The apparatus of paragraph 293, in which the at least one group includes at least one member having at least one desired characteristic.

The apparatus of paragraph 330, in which the first element is configured to receive at least one third representation of the desired characteristic from at least one user.

The apparatus of paragraph 331, in which the first element is configured to receive the at least one second representation from the at least one user.

The apparatus of paragraph 331, in which the at least one user includes a customer of at least one of a merchant and a service provider.

The apparatus of paragraph 331, in which the at least one user includes at least one of a merchant and a service provider.

The apparatus of paragraph 331, in which the at least one third representation include at least one electronic message.

The apparatus of paragraph 335, in which the at least one electronic message includes at least one of an HTTP message, a database message, a SMS message, a MMS message, and an email message.

The apparatus of paragraph 330, in which the at least one desired characteristic includes a geographic area.

The apparatus of paragraph 337, in which the geographic area includes at least one of a geographic area in which the at least one user lives and a geographic area of a place of business of the at least one user.

The apparatus of paragraph 330, in which the at least one desired characteristic includes a profession.

The apparatus of paragraph 339, in which the profession includes a first profession in which the at least one user works.

The apparatus of paragraph 330, in which the at least one desired characteristic includes membership in an organization.

The apparatus of paragraph 341, in which the at least one user is a member of the organization.

The apparatus of paragraph 293, in which the at least one first element is further configured to transmit at least one third representation of the filtered plurality of first representations.

The apparatus of paragraph 343, in which the at least one third representation includes at least one interface through which a user may view the filtered plurality of first representations.

The apparatus of paragraph 344, in which the at least one interface includes at least one of a website, a mobile device interface, and an email message.

The apparatus of paragraph 343, in which the at least one third representation includes an electronic message.

The apparatus of paragraph 346, in which the electronic message includes at least one of an HTTP message, a database message, a SMS message, a MMS message, and an email message.

The apparatus of paragraph 293, in which the at least one second representation includes a representation of at least one member of the group.

The apparatus of paragraph 293, in which the at least one second representation includes a contact list.

The apparatus of paragraph 349, in which the at least one member of the at least one group includes at least one contact of the contact list.

The apparatus of paragraph 349, in which the contact list includes at least one email contact list.

The apparatus of paragraph 293, in which for at least one member of the at least one group, the at least one second representation includes at least one of a name, an email address, a login name, a mailing address, a telephone number, and a user identifier.

The apparatus of paragraph 293, in which the second element is configured to generate at least one recommendation based, at least in part, on the filtered plurality of first representations.

The apparatus of paragraph 353, in which the at least one recommendation includes a first recommendation for at least one of a product of a merchant and a service of a service provider, and in which at least one first report represented by at least one representation of the filtered plurality of first representations is a report on the at least one of the product and the service.

The apparatus of paragraph 354, in which the at least one first report includes a positive report.

The apparatus of paragraph 354, in which the at least one first report includes a high rating of the at least one of the product and the service.

The apparatus of paragraph 356, in which the high rating includes at least one first rating that is higher than at least one second rating given to at least one of a non-recommended product and a non-recommended service by at least one second report represented by at least one other representation of the plurality of first representations.

The apparatus of paragraph 353, in which the second element is configured to transmit at least one third representation of the at least one recommendation.

The apparatus of paragraph 293, in which the second element is configured to choose at least one of a chosen product of a merchant and a chosen service of a service provider based, at least in part, on the filtered plurality of first representations.

The apparatus of paragraph 359, in which at least one first report represented by at least one representation of the filtered plurality of first representations is a report on the at least one of the chosen product and the chosen service.

The apparatus of paragraph 360, in which the at least one first report includes a positive report.

The apparatus of paragraph 360, in which the at least one first report includes a high rating of the at least one of the chosen product and the chosen service.

The apparatus of paragraph 362, in which the high rating includes at least one first rating that is higher than at least one second rating given to at least one of a non-chosen product and a non-chosen service by at least one second report represented by at least one other representation of the plurality of first representations.

The apparatus of paragraph 293, in which the first element includes at least one input/output device and the second element includes at least one processor.

An apparatus comprising: a first element configured to receive at least one request and further configured to receive a plurality of first representations, in which each first representation represents a report and an originator of the report;

and configured to respond to the at least one request by transmitting at least one second representation of at least one subset of the plurality of first representations, in which in the at least one subset does not include at least one first representations that represents an originator that is not a member of at least one group.

The apparatus of paragraph 365, in which the at least one subset does not include at least one first representation that represents an originator that is a member of the at least one group and that represents a negative report.

The apparatus of paragraph 365, in which each first representation of the plurality of first representations includes a representation of at least one of a respective target of the respective report and a respective target type of the respective report.

The apparatus of paragraph 367, in which the at least one subset does not include at least one first representation that represents at least one of an undesired target and an undesired target type.

The apparatus of paragraph 365, in which the first element is configured to receive the plurality of first representations from a plurality of sources.

The apparatus of paragraph 369, in which the plurality of sources includes at least one individual.

The apparatus of paragraph 370, in which the at least one individual includes at least one user of at least one website.

The apparatus of paragraph 369, in which the plurality of sources includes at least one collector of reports.

The apparatus of paragraph 372, in which the at least one collector of reports includes at least one website.

The apparatus of paragraph 365, in which the plurality of first representations includes at least one electronic message.

The apparatus of paragraph 374, in which the electronic message includes at least one of an email message, an HTTP message, a database message, an MMS message, and an SMS message.

The apparatus of paragraph 365, in which the at least one request includes an electronic message.

The apparatus of paragraph 376, in which the electronic message includes at least one of an email message, an HTTP message, a database message, an MMS message, and an SMS message.

The apparatus of paragraph 365, in which each first representation of the plurality of first representations includes a representation of at least one of a respective target and a respective type of the respective report.

The apparatus of paragraph 365, in which the respective includes at least one of a product, a merchant, a service, and a service provider and the respective type includes at least one of a type of product, a type of merchant, a type of service, and a type of service provider.

The apparatus of paragraph 365, in which at least one first representation of the plurality of first representations comprises an indication of at last one purchase, the report represented by the at least one first representation comprises a purchase by a purchaser, and the originator represented by the at least one first representation comprises the purchaser.

The apparatus of paragraph 365, in which at least one report represented by at least one first representation of the plurality of first representations includes at least one report on a service of a service provider.

The apparatus of paragraph 381, in which the at least one report includes at least one rating of the service, review of the service, a recommendation for the service, a recommendation against the service, and a fact regarding the service.

The apparatus of paragraph 381, in which the service includes a delivery service.

The apparatus of paragraph 383, in which the at least one report includes at least one of a time taken by the delivery service, a rating of the delivery service, a review of the delivery service, a recommendation for the delivery service, and a recommendation against the delivery service.

The apparatus of paragraph 365, in which at least one report represented by at least one first representation of the plurality of first representations includes at least one report on a product of a merchant.

The apparatus of paragraph 385, in which the at least one report includes at least one of a review of the product, a rating of the product, a recommendation for the product, a recommendation against the product, and a fact regarding the product.

The apparatus of paragraph 365, in which the at least one group includes a social network of an entity.

The apparatus of paragraph 387, in which the entity includes a user.

The apparatus of paragraph 388, in which the user includes at least one of a merchant and a service provider.

The apparatus of paragraph 388, in which the user includes a customer of at least one of a merchant and a service provider.

The apparatus of paragraph 387, in which each member of the social network is related to at least one of other of the entity and another member of the social network.

The apparatus of paragraph 391, in which each member of the social network is a friend of at least one of the entity and another member of the social network.

The apparatus of paragraph 391, in which each member of the social network is a contact of at least one of the entity and another member of the social network.

The apparatus of paragraph 391, in which each member of the social network is a colleague of at least one of the entity and another member of the social network.

The apparatus of paragraph 365, in which the at least one group includes a reporter chosen by a user.

The apparatus of paragraph 395, in which the first element is further configured to receive a third representation of the chosen reporter from the user.

The apparatus of paragraph 396, in which the first element is further configured to add the chosen reviewer to the at least one group.

The apparatus of paragraph 365, in which the chosen reviewer is at least one of a professional reporter, a celebrity, and a reporting organization.

The apparatus of paragraph 365, in which the at least one group includes at least one first member having at least one desired characteristic.

The apparatus of paragraph 399, in which the at least one desired characteristic includes a geographic area.

The apparatus of paragraph 400, in which the geographic area includes a geographic area in which the user lives and a geographic area of a place of business of the user.

The apparatus of paragraph 399, in which the at least one desired characteristic includes a profession.

The apparatus of paragraph 402, in which the profession includes a first profession in which the user works.

The apparatus of paragraph 399, in which the at least one desired characteristic includes membership in an organization.

The apparatus of paragraph 404, in which the uses is a member of the organization.

The apparatus of paragraph 399, in which the first element is further configured to receive at least one third representation of the desired characteristic from the user.

The apparatus of paragraph 406, in which the at least one third representation includes at least one electronic message.

The apparatus of paragraph 407, in which the at least one electronic message includes at least one of an HTTP message, a database message, a SMS message, a MMS message, and an email message.

The apparatus of paragraph 365, in which the first element is configured to transmit the at least one second representation to a user.

The apparatus of paragraph 409, in which the at least one second representation includes at least one electronic message.

The apparatus of paragraph 410, in which the at least one electronic message includes at least one of an HTTP message, an email, a database message, a SMS message, and a MMS message.

The apparatus of paragraph 365, in which the first element is configured to display the at least one second representation through at least one interface.

The apparatus of paragraph 412, in which the at least one interface includes at least one of a website, a mobile device interface, and an email.

The apparatus of paragraph 365, in which the at least one group includes at least one contact from a contact list of a user.

The apparatus of paragraph 414, in which the contact list includes at least one email contact list.

The apparatus of paragraph 365, in which the first element is configured to receive at least one third representation of the at least one group from a user.

The apparatus of paragraph 416, in which for at least one member of the at least one group, the at least one third representation includes at least one of a name, an email address, a login name, a mailing address, a telephone number, and a user identifier.

The apparatus of paragraph 365, in which the first element is configured to maintain and generate the at least one group.

The apparatus of paragraph 365, in the first element is configured to make at least one recommendation based, at least in part, on the at least one subset of the plurality of first representations.

The apparatus of paragraph 419, in which the at least one recommendation includes a first recommendation or at least one of a recommended product of merchant and a recommended service of a service provider, and in which at least one first report represented by at least one of the at least one subset of the plurality of first representations is a report on the at least one of the recommended product and the recommended service.

The apparatus of paragraph 420, in which the at least one report includes a positive report.

The apparatus of 420, in which the at least one first report includes a high rating of the at least one of the recommended product and the recommended service.

The apparatus of paragraph 421, in which the high rating includes at least one first rating that is higher than at least one second rating given to at least one of a non-recommended product and a non-recommended service by at least one second report represented by at least one other representation of the plurality of first representations.

The apparatus of paragraph 419, in which the first element is configured to present at least one third representation of the at least one of the recommended product and the recommended service to a user.

The apparatus of paragraph 424, in which the first element is configured to display the at least one third recommendation through a user interface.

The apparatus of paragraph 424, in which the first element is configured to display the at least one third representation through a video display.

The apparatus of paragraph 365, in which the first element is configured to choose at least one of a product of a chosen merchant and a chosen service of a service provider based, at least in part, on the subset of the plurality of first representations.

The apparatus of paragraph 427, in which at least one first report represented by at least one representation of the subset of the plurality of first representations includes a report on the at least one of the chosen product and the chosen service.

The apparatus of paragraph 428, in which the at least one first report includes a positive report.

The apparatus of paragraph 428, in which the at least one first report includes a high rating of the at least one of the chosen product and the chosen service.

The apparatus of paragraph 430, in which the high rating includes at least one first rating that is higher than at least one second rating given to at least one of a non-chosen product and a non-chosen service by at least one second report representation by at least one other representation of the plurality of first representations.

The apparatus of paragraph 365, in which the first element includes at least one computer system.

Terms

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", "having", "containing", "involving", and variations thereof mean "including but not limited to", unless expressly specified otherwise. The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". Similarly, the phrase "based on" does not mean "based on the entirety of", "based on all of", or variations thereon, unless expressly specified otherwise.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like. The term "determining" does not imply that mathematical processing must be performed, and does not imply that numerical methods must be used, and does not imply that an algorithm or process is used. The term "determining" does not imply that any particular device must be used. For example, a computer need not necessarily perform the determining.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the present invention", unless expressly specified otherwise.

The term "report" and variations thereof used herein mean any information concerning one or more products, services, merchants and/or service providers. In some example implementations, a report may include a written or oral review and/or a quantitative or qualitative assessment (e.g., four stars, thumbs up, 98%). In some example implementations, a report may include a positive or negative recommendation. In some example implementations, a report may include an indication of a fact, for example, a photograph of a product, a recording of speed (e.g., delivery time), a measurement of weight, a recording of color, etc. In some further example implementations, a report may include an indication of a purchase of a good from a merchant and/or a service from a service provider.

The term "electronic message" and variations thereof used herein should be understood to mean any electronic representation of information. For example an HTTP message, an SMS message, a database message, an MMS message, a database message (e.g., SQL message) or any other series of electrical signals that represent information may be considered an electronic message. An electronic message does not include information identifying a source and/or destination such as the information typically present in a TCP/IP header. Rather, the electronic message should be considered the body/content of the TCP/IP packet.

The term "representation" and variations thereof used herein in reference to a thing should be understood to refer to any indication of at least a portion of the thing. A representation of a report, for example, may include any indication of at least a portion of the report. In some embodiments, the thing may be determined by a person or computing device from the representation of the thing. In some example implementations, a representation may include a copy of a thing in any of a variety of formats, compressions, and/or encryptions. In another example implementation, a representation may include an index or other identifier of a thing, such as a position in a list, an ID number, or a database key. A representation of a thing may be in the same or different medium as an original thing. For example, a number "1" may represent a sound, a color, a rating, or any other thing depending, e.g., on the configuration of a computing system configured to interpret the number. A representation may be divided into a plurality of portions, such as a plurality of electronic messages being transmitted from one location to another.

The term "collector of reports" and variations thereof used herein should be understood to mean any component or individual or set of components or individuals that collect/store at least one representation of a report. A collector of reports, for example, may include a database server on which a database of reports is stored, the database stored on the server, and a website (i.e., a web server and/or other components used to operate a website such as executed programs) through which a user may enter a report that is stored on the database server.

The term "monitor" and variations thereof should be understood to mean any component or individual or set of components or individual configured to monitor one or more events and generate a report based, at least in part, on the one or more events. A monitor may include an executed computer program. A monitor (e.g., a program executed by one or more computer systems), for example, may monitor the time needed to perform a delivery service and generate a report indicating that time with the customer of the delivery service identified as the originator of the report. For a second example, a monitor (e.g., a website) may monitor purchases of products by a customer and generate reports indicating the purchases with the customer identified as the originator.

The term "source" and variations thereof used herein should be understood to mean any intermediate and/or original provider of a report. For example, in some implementations, a source may include a person that originally generates a report (e.g., by entering the report into a user interface). In some implementations, a source may include a monitor. In some implementations, a source may include a collector of reports that may have collected reports from another collector of reports, an originator, or a monitor. A source of a report may be the same or different from an originator of a report.

The term "originator" and variations thereof used herein should be understood to mean an individual or organization responsible for the creation of a report. An originator of a report may be but is not required to be different from a source of a report. For example, in some embodiments, an originator of a report may be an individual who creates the report by entering it into a user interface. In some embodiments, an originator of a report may be an individual whose actions result in the report being created (e.g., an individual that makes a purchase resulting in the report being generated by a monitor, an individual that places an order for service to be performed, such as delivery of a product, that results in a report being generated by a monitor).

The term "social network" and variations thereof used herein should be understood to mean a set of individuals, in which each individual of the set socially relates to the other members of the set through some social contact, either directly or indirectly. A social network of a particular individual refers to a social network in which each member of the set is socially related to the individual either directly or through other members of the set. In some embodiments, the members may be friends, family, neighbors, colleagues, and/or acquaintances. In some embodiments, a social network of a particular individual may be limited to members that are directly socially related to the individual or related through a maximum number of other members of the set.

A "user" of an embodiment of the present invention may include individuals, organizations and/or computer systems that receive from or transmit to any component of an embodiment of the present invention either directly or indirectly. For example, a user may include a visitor to a website configured in accordance with an embodiment of the present invention. A user may also include an originator of a report collected by a collector of reports.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers (e.g., "a plurality of first widgets" indicates two or more widgets that are distinct from other widgets). For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are Not Limiting

Neither the Title (set forth at the beginning of the first page of the present application) nor the Abstract (set forth at the end of the present application) is to be taken as limiting in any way as the scope of the present invention. An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are presented for illustrative purposes only. The described embodiments are not, and are not intended to be, limiting in any sense. One of ordinary skill in the art will recognize that the present invention may be practiced with various modifications and alterations, such as structural, logical, software, and electrical modifications. Although particular features of the present invention may be described with reference to one or more particular embodiments and/or drawings, it should be understood that such features are not limited to usage in the one or more particular embodiments or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention. Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the present invention, and does not imply that the illustrated process is preferred.

Although a process may be described as including a plurality of steps, that does not imply that all or any of the steps are preferred, essential or required. Various other embodiments within the scope of the present invention may include other processes that omit some or all of the described steps. Unless otherwise specified explicitly, no step is essential or required.

Although a process or product may be described singly or without reference to other processes or products, in some embodiments the process or product may interact with other processes or products. For example, such interaction may include linking one business model to another business model. Such interaction may be provided to enhance the flexibility or desirability of the process.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. Also, an enumerated list of items (which may or may not be numbered) does not imply that any or all of the items are equivalent to each other or readily substituted for each other.

Computing

It should be appreciated that the various processes described herein may be implemented by, e.g., appropriately programmed computer systems, e.g., general purpose computers 101 and/or computing devices 103, illustrated in FIG. 1. A computing device 103 may include a specialized or general purpose computing device such as a cellular phone, a personal digital assistant, and/or any other portable or non-portable computing system that is not a general purpose computer.

A "processor" 105 means one or more microprocessors, central processing units (CPUs), computing devices, microcontrollers, digital signal processors, application specific integrated circuits, or like devices or any combination thereof. A processor may include an Intel® Pentium®, Centrino®, and/or Core® processor. Typically a processor 105 will receive instructions (e.g., from a memory or like device), and execute those instructions, thereby performing one or more processes defined by those instructions.

Thus a description of a process is likewise a description of an apparatus for performing the process. The apparatus that performs the process may include, e.g., a processor 105 and those input devices and/output output devices (e.g., a keyboard 107, mouse, trackball, microphone, touch screen, printing device, display screen 109, speaker, network interface 111) that are appropriate to perform the process.

Further, programs (i.e., collections of instructions) that implement such methods (as well as other types of data) may be stored and transmitted using a variety of media (e.g., machine-readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

In some embodiments, the processor 105 may execute an operating system which may include, for example, the Windows-based operating systems (e.g., Windows NT, Windows 2000 (Windows ME), Windows XP, Windows Vista operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together may define a computer platform for which programs stored on machine-readable medium may be written in various programming languages, including an object-oriented programming language, such as SmallTalk, Java, C++, Ada, Python, or C# (C-Sharp), functional programming languages, scripting programming languages, and/or logical programming languages. Various aspects of the invention may be implemented in a non-programmed environment (e.g., documents created in HTML, XML or other format that, when viewed in a window of a browser program, render aspects of a GUI or perform other functions).

Various embodiments of the present invention may include in a network environment including one or more computing systems (e.g., general purpose computers 101, other computing devices 103) in communication through one or more communication networks (e.g., a LAN 119, the Internet 121). The computer systems may communicate directly or indirectly, via any wired or wireless medium (e.g. the Internet 121, LAN 119, WAN or Ethernet, Token Ring, a telephone line, a cable line, a radio channel, an optical communications line, commercial on-line service providers, bulletin board systems, a satellite communications link, cellular telephone networks, a WI-FI network, a Bluetooth communication link, a combination of any of the above).

Various aspects of the invention (e.g., program elements stored on machine-readable media and executable by one or more processors) may be distributed among one or more computer systems configured to provide a service to one or more client computer systems. For example, in some embodiments, a plurality of computing systems may be organized as a central authority connected to a LAN of other communication network. These computing systems may receive requests and other information from remote computing systems through the Internet 121.

In some embodiments of the present invention, one or more computer system may act as a database server that stores representations of reports, representations of groups, information regarding users, and/or any other desired information. The database server may respond to database requests such as structured query language (SQL) queries by providing access to a database (e.g., searching of the database, writing to the database).

In some embodiments, one or more computer systems may act as a web server. A web server may be configured to respond to network requests (e.g., HTTP messages) from web browsers executed by remote computer systems. For example, a web browser 123 executed by a computing system may direct an HTTP message through the Internet 121 to an edge routing device 125 connected to the LAN 119. The edge routing 125 device may be configured to direct the HTTP message to the web server through the LAN 119. The web server may provide a response (e.g., an HTML document) to the web browser 123 through the edge routing device 125 and Internet 121. The web server may be configured to communicate with other computer systems (e.g., a database server) to generate responses to such a received request.

In some embodiments, a server computer or centralized authority may not be necessary or desirable. For example, the present invention may, in an embodiment, be practiced on one or more computing devices without a central authority. In such an embodiment, any functions described herein as performed by a server or data described as stored on a general purpose computer may instead be performed by or stored on one or more such computing devices.

The term "machine-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 113 and other persistent memory. Volatile media include dynamic random access memory 115 (DRAM), which typically constitutes the main memory. Transmission media include coaxial cables, copper wire and fiber optics, including the wires that comprise a system bus 117 coupled to the processor. Transmission media may include or convey acoustic waves, light waves and electromagnetic emissions, such as those generated during radio frequency (RF) and infrared (IR) data communications. Common forms of machine-readable media include, for example, a floppy disk, a flexible disk, a hard disk, a magnetic tape, any other magnetic medium, a CD-ROM, a DVD, any other optical medium, punch cards, a paper tape, any other physical medium with patterns of holes, a RAM, a PROM, an EPROM, a FLASH- EEPROM, any other memory chip or cartridge, a carrier wave as described hereinafter, or any other medium from which a computer can read.

Various forms of machine-readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a machine-readable medium storing a program for performing the process. The machine-readable medium can store (in any appropriate format) those program elements that are appropriate to perform the process.

Where a process is described, in some embodiments the process may operate without any user intervention. In other embodiments, the process includes some human intervention (e.g., a step is performed by or with the assistance of a human).

Just as the description of various steps in a process does not indicate that all the described steps are required, embodiments of an apparatus may include one or more computer systems operable to perform some (but not necessarily all) of the described process.

Likewise, just as the description of various steps in a process does not indicate that all the described steps are required, embodiments of a machine-readable medium storing a program or data structure include a machine-readable medium storing a program that, when executed, can cause one or more processors to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement processes described herein. In addition, the databases may, in a known manner, be stored locally or remotely from a device which accesses data in such a database.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants may file additional applications to pursue patents for subject matter that has been disclosed and enabled but not claimed in the present application.

Exemplary Embodiments

Methods and apparatus related to filtering reports based on groups are described herein. For example, some embodiments of the present invention relate to filtering a plurality of reports to exclude those reports that are not originated by members of a desired group (e.g., a social network). By filtering reports in this way, a viewer of the reports easily focus on those reports originated by preferred sources, such as friends and relatives, and ignore those reports originated by untrusted or unknown sources.

Figure 2:
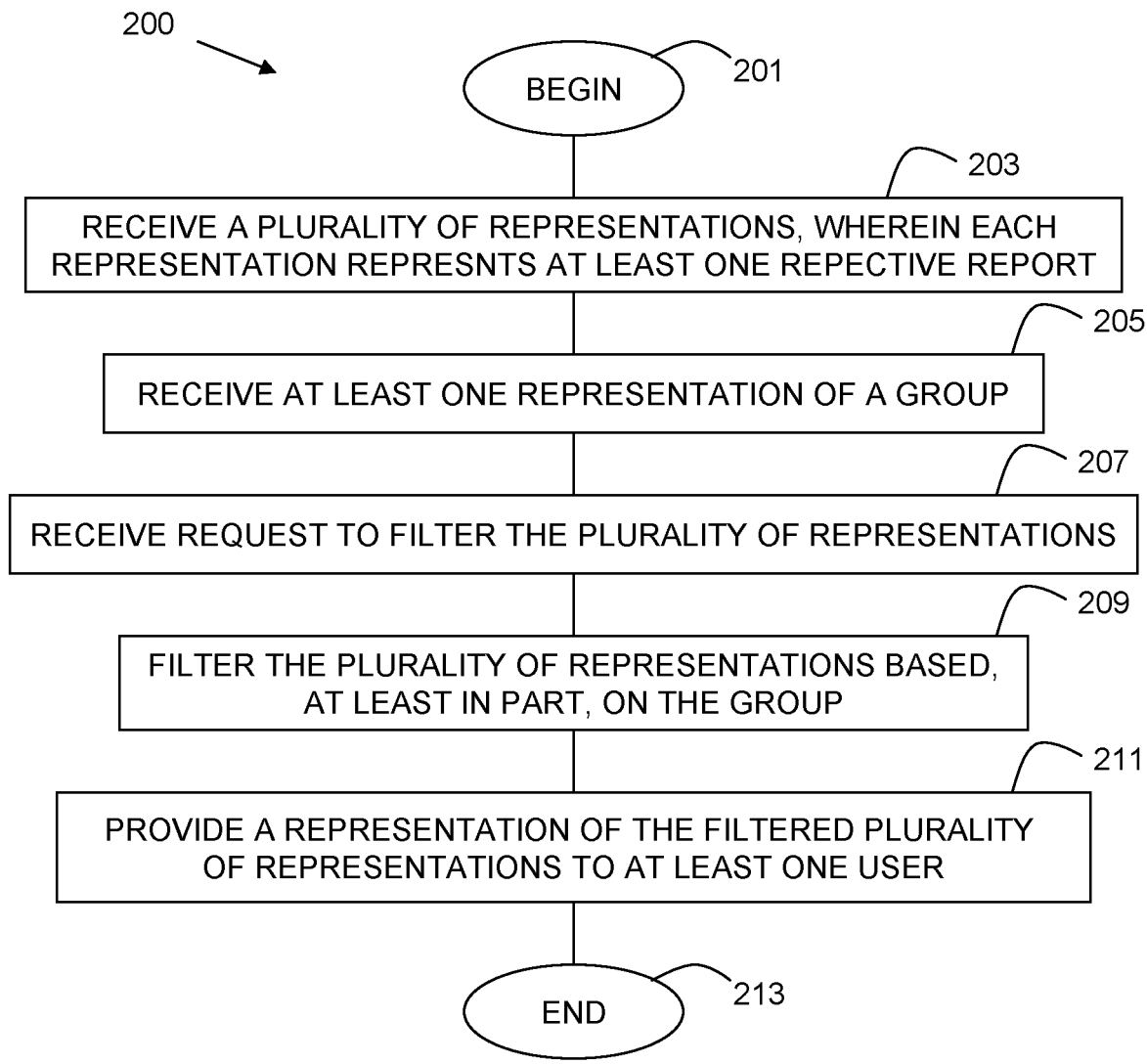
FIG. 2 illustrates a process that may be performed in accordance with some embodiments of the present invention.

FIG. 2 illustrates a process 200, beginning at block 201, in accordance with some embodiments of the present invention (e.g., may be performed by a computing system as described above, may be stored on a machine-readable medium as described above). Process 200 includes receiving a plurality of representations, wherein each representation represents at least one respective report (indicated at block 203); receiving at least one representation of a group (indicated at block 205); receiving a request to filter the plurality of representations (indicated at block 207); filtering the plurality of representations based, at least in part, on the group (indicated at block 209); and providing a representation of the filtered plurality of representations to at least one user (indicated at block 211).

As indicated at block 203, process 200 may include receiving a plurality of representations, wherein each representation of the plurality of representations representing a respective report. The plurality of representations may be received from a plurality of sources. In some embodiments, the sources may include individuals (e.g., users of a website may enter the report through a web browser), a monitor of an event (e.g., a website configured to transmit a representation of a report upon a purchase of a product through the website) and/or collectors of reports (e.g., websites or database that may collect reports). In some embodiments, a webcrawler may search a plurality of collectors or reports to obtain one or more representations of the plurality of representations. It should be recognized that some embodiments of process 200 may not receive any representations of reports, but rather may begin a process already in possession of a representations of reports.

In some embodiments, each representation of the plurality of representations may include one or more electronic messages. The electronic messages may be in any format including standard machine readable formats such as SQL or other database messages, MMS messages, SMS messages, email messages, and HTTP messages. Individuals may send the representations in any format and through any means including through a user interface such as a website accessible through the Internet by a standard web browser, through a mobile device interface, such as a cellular phone, and/or through an email client. In some embodiments, a report may be transmitted from a collector of reports or a monitor through a database message, e.g., in response to a database query sent to the collector of reports or as a write request to the database from the monitor.

In some embodiments, a report may be received from a monitor after an occurrence of a trigger event (e.g., a purchase of a product, a delivery of a good). For example, in one embodiment, a time when an order is received from a user (e.g., entered through a user interface by the user) and a time when the order is fulfilled (e.g., when a product is deliver, when a service is completed) may be monitored. A report may be generated by the monitor indicating the time needed to fill the order. In some embodiments, the monitor may then transmit a representation of the report to one or more computer systems performing process 200. For a second example, a purchase of a product or service (e.g., though a user interface by a user) may trigger a transmission of a representation of a report indicating the occurrence of the purchase. It should be understood that in some embodiments, the same computer system or systems may act as a monitor and perform part or all of process 200.

In some embodiments, a representation of a report may also represent an originator of the report. By connecting originators to reports in such a way, a report may be attributed to an individual who is most responsible for the report and who may verify the report, and reports may be tracked and/or filtered based on the originators.

In some embodiments, a representation of a report may also represent a target of the report. A target of the report may include a product, service, service provide, and/or merchant which the report is about. For example, a target of a report indicating a purchase of a product may include a representation of the product.

After receiving each representation of a respective report, at least a portion of the content of the report may be stored, for example, on a machine-readable medium. In some embodiments, the at least a portion of the report may be stored in a database table on a database server. One example of a database table in which the at least a portion of the report may be stored according to some embodiments of the present invention is illustrated in FIG. 3A. As illustrated for examples only, the at least a portion of the report may include phrases (e.g., "I like this product"), facts describing the target (e.g., 7 pounds), ratings (e.g., rating1), or an indication of whether or not a target is recommended. In some embodiments, the at least a portion of the content may be limited to one type of information (e.g., only ratings, only facts, only written phrases). As illustrated, each at least a portion of a report may be stored in a database table along with a unique ID that may be used to identify the report, an identification of an originator of the report, and/or an identification of a target of the report. It should be understood that this table is an example only and that other embodiments may include more or fewer database columns.

As indicated in block 205, process 200 may include receiving at least one representation of a group. As discussed with respect to the plurality of representations of the plurality of reports, the at least on representation of a group may include one or more electronic messages. The electronic messages may be in any format including standard machine readable formats such as SQL or other database messages, MMS messages, SMS messages, email messages, and HTTP messages. It should be recognized that some embodiments of process 200 may not receive any representations of a group, but rather may begin a process already in possession of the representation of the group.

In some embodiments, the group may include a social network. For example, in some embodiments, the group may include a social network of a user of a website or computing device. The social network may be the social network of a customer (e.g., an individual choosing to purchase a product or service from a merchant or service provider) or a social network of a merchant or service provider. In some embodiments, a representation of the social network or other group associated with the user may include a representation of the user.

Some embodiments of the present invention may be configured to maintain one or more groups. For example, FIG. 3B illustrates a database table that may be used by some embodiments of the present invention to maintain a group and/or track users. As illustrated, each row of the table is associated with one user. Each row includes elements indicating a unique identifier for the user that may be used to identify the user, a name of the user, and login information, such as a login name and password that may be used to log the user into and/or securely identify the user to a computer system on which some portion of the process 200 may be performed (e.g., through a website or other user interface). In some embodiments, alternative or additional information may be included in such a database table, including identification information such as an email address, a telephone number, a mailing address, and/or any other information that may identify the user. In some embodiments, user information may be obtained from one or more collectors of reports and/or monitors. A database table may be configured to store a set of information that is compatible with user information collected by the one or more collectors of reports and/or monitors. For example, if a first collector of reports associates reports only with email addresses and a second collector of reports associates reports only with names, some embodiments of the present invention may include a database that can associate each user with either a name or an email address.

As illustrated in the table of FIG. 3B, an entry for a user may include an element identifying at least some of the other users in the user's social network. For example, User1 in the illustrated table is networked to both User4 and User3, and likewise, User3 and User4 are each networked to User1. A social network of a user may be generated by determining the other users to which the user is networked. A social network may also include any number of successive levels of network users (e.g., the users to which the other users are network). In some embodiments, the number of successive levels may be determined by a system administrator. In some embodiments, an indication of the number of successive levels may be included in the representation of the group.

In some embodiments, a social network of a user may be expanded unilaterally by the user. For example, a first user may request that a second user be added to the first user's social network. When the request is received, the second user may be added to the first user's social network, for example by adding the second user to the first user's networked users list in the table of FIG. 3A. In some embodiments, the first user may also be added to the second user's networked users list.

In some embodiments, a social network of a user may be expanded bilaterally. For example, a first user may request a second user be added to the first user's social network. After receiving that request, an embodiment of the present invention may request acceptance from the second user (e.g., transmit a request for agreement to being added to the first user's social network). If the second user agrees to join the first user's social network, such an embodiment may then add the second user to the first user's social network (e.g., by adding the second user to the first user's networked users list). In some embodiments, the first user may also be added to the second user's social network.

In some embodiments, a second user may request to be added to a first user's social network. As described above, some embodiments may add such a user unilaterally. As described above, some embodiments may add such a user bilaterally.

Limiting the expansion of a social network to bilateral expansion may help ensure that each member of a social network is, in fact, socially related to another member of the social network. The social relationships between members may include, for example, one or more of friends, family, contacts, acquaintances, neighbors and colleagues. In some embodiments, the social relationships may be limited to one or more of these or other categories (e.g., a family social network, a neighborhood social network, etc.).

In some embodiments that maintain a database table similar to the one illustrated in FIG. 3B, a representation of a group (e.g., social network) may include a representation of a user. As discussed above, the social network associated with that user may be derived from the identity of the user by searching the networked users column of the table of FIG. 3B. The representation of the user may include any information from which the user's identity may be derived, including, in various embodiments, a name, an email address, a login name, a user identifier (e.g., id number), a telephone number, a mailing address, and/or any other information that may identify the user.

In some embodiments, other ways of maintaining and/or generating a social network may be additionally or alternatively employed. For example, in some embodiments, a contact list (e.g., an email contact list such as the one used by Microsoft® Outlook®, a telephone number list maintained on a cellular telephone) may be used to maintain and identify a user's social network. In such embodiments, the contact list may be maintained either on a user's personal computing device (e.g., a personal computer, a cellular phone) and/or on a server computer. In some embodiments, filtering of reports based on the group, as discussed below, may occur by the user's personal computing device and/or by the server computer.

In some embodiments, a group may additionally or alternatively include one or more chosen reporters. A chosen reporter may include any individual or origination that originates a report regardless of whether that chosen reporter is socially related to any other user. In some embodiments, a chosen reporter may include a celebrity, a professional reporter, and/or a reporting organization (e.g., Consumer Reports®). By allowing such chosen reporters outside of a user's social network to be added to a group, such embodiments may allow representations of reports from originators that may not be socially related to a user to be included in a representation of a filtered plurality of representations of reports if the reports are nonetheless originated by a trusted originator.

The representation of the group received by some embodiments may include a representation of a chosen reporter. In some embodiments, a reporter of the embodiment may choose such reporters through a user interface. In some embodiments, choosing a user may be similar to unilaterally adding a member to a social network. For example, a user may choose one or more reporters, submit a request to add those chosen reporters to a group of chosen reporters, an embodiment of the invention may receive that request and add the chosen reporters to a group of chosen reporters associated with the user. In some embodiments, for example, as illustrated in the table of FIG. 3B, such users may be added to a list of chosen users in a database table.

As another example of a method of maintaining a group, some embodiments may maintain a group based on one or more desired characteristics. For example, a group may include only members having one or more desired characteristics. In such embodiments, a representation of a group may include a representation of the one or more desired characteristics. In some embodiments the desired characteristics may include a geographic location such as a place of business or a place in which a user lives, a profession such as a profession in which a user who transmits the representation of the desired characteristic works, a membership in an organization such as an organization (e.g., company club, etc.) in which a user who transmits the representations of the desired characteristic is a member, and/or any other desired characteristics, including demographic information such as gender, income, marital status, etc.

As illustrated in the table of FIG. 3B, characteristics associated with each user may be recorded in a database table. In some embodiments, for example, a user of such a computer system (e.g., a user of a website or other user interface) may be asked to provide such characteristics upon signing up with the computer system through a user interface (e.g., a website). The table of FIG. 3B may be searched to find users having desired characteristics by searching this list of characteristics for the desired characteristics.

As indicated in block 207, process 200 may include receiving a request to filter the plurality of representations from a user. In some embodiments, a user may transmit such a request through a user interface, for example, by clicking on a button or link on a website or a button of a portable computing device. In some embodiments, receiving the request and the representation of the group may be part of a single act rather than separate acts. For example, the request may include the representation of the group.

Figure 4:
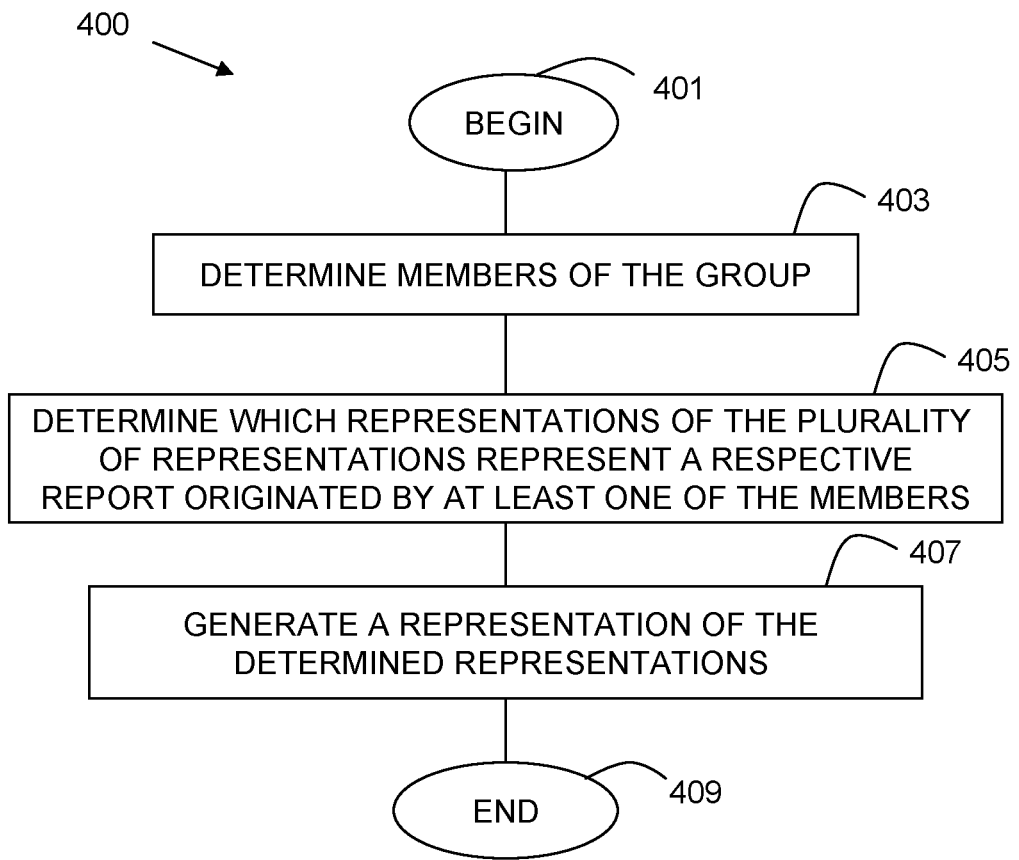
FIG. 4 illustrates a process for filtering representations of reports that may be performed in accordance with some embodiments of the present invention.

As indicated in block 209, process 200 may include filtering the plurality of representations based, at lease in part, on the group. In some embodiments, filtering the plurality of representations may include excluding representations that represent reports not originated by a member of the group from a new representation of reports. FIG. 4 illustrates a process 400 that begins at block 401 and may be performed to filter the plurality of representations in accordance with some embodiments of the present invention. Process 400 includes determining members of the group (indicated at block 403), determining which representations of the plurality of representations represent a respective report originated by at least one of the members of the group (indicated at block 405), and generating a representation of the determined respective reports or representations of reports (indicated at block 407).

As indicated in block 403, process 400 may include determining members of the group. As described above, members of a group may be determined in some embodiments by reference to a database table such as the table illustrated in FIG. 3B (e.g., through a database query). In other embodiments, members of the group may be determined in any method from any information, for example, from a different database table, from a contact list, etc. These determined members make up a set of members.

As indicated in block 405, process 400 may include determining which representations of the plurality of representations of reports represent reports originated by any of the members of the set of members. For example, this may be performed by comparing the originator of each report (e.g., from the database table of FIG. 3A) to the set of members. In some embodiments, this may be performed through one or more database queries.

As indicated in block 407, process 400 may include generating a representation of these determined (i.e., filtered) respective reports or representations of reports. In some embodiments, the representation may include a representation of each of the plurality of representations having an originator that is a member of the group. The representation may be comprised of one or more electronic messages. The electronic messages may be in any format including standard machine readable formats such as SQL or other database messages, MMS messages, SMS messages, email messages, and HTTP messages. Process 400 may end at block 409.

In some embodiments, a process of filtering the representations may include filtering representations of negative reports. Such embodiments may include additional acts of determining if a report is positive (e.g., a high rating, a recommendation for a thing, etc.) or negative (a low rating, a recommendation against a thing, etc.). The representations of the negative reports may be excluded from the representation of the determined plurality of representations (e.g., at block 407).

Returning to FIG. 2, as indicated in block 211, process 200 may include providing the representation of the filtered plurality of representations to the at least one user. In some embodiments, the representation may be provided by transmitting one or more electronic messages to one or more computing systems. In some embodiments, the representation may include or be provided through a user interface, such as a user interface transmitted through the Internet or another communication network. For example, the user interface may include a website, a mobile device interface, and/or an email message. In some embodiments, the representation may be provided to the user by presenting the representation through a video display screen (e.g., a computer monitor, a portable device display) Process 200 may end at block 213.

Some embodiments of the invention may include an act of making a recommendation to the user based on the filtered plurality of representations. The recommendation may be provided to the user instead of or in addition to the representation of the filtered plurality of representations. The recommendation may include a recommendation for a product, merchant, service and/or service provider. The product, merchant, service, and/or service provider may be a target of at least one report represented by at least one representation of the filtered plurality of representations. The at least one report may be a positive report (e.g., a recommendation for a product, a high rating). In some embodiments, the recommendation may be for a target associated with the largest number of positive reports represented by the filtered plurality of representations. The recommendation may be for a target associated with a highest rating or highest aggregate rating of all the targets associated with the filtered plurality of representations.

Some embodiments of the present invention may include an act of choosing a product, service, merchant, and/or service provider based, at least in part, on the filtered plurality of representations. The product, service, merchant, and/or service provider may be chosen instead of or in addition to the making of a recommendation and/or the transmission/presentation of the filtered plurality of representations. The chosen product, merchant, service, and/or service provider may be a target of at least one report represented by at least one representation of the filtered plurality of representations. The target, for example, may be purchased from a merchant or service provider automatically, or a service or product may be purchased from a target automatically. In some embodiments, a user, after receiving a recommendation and/or a representation of the filtered plurality of representations may choose one or more of the targets represented by the filtered plurality of representations through a user interface, such as a website. In some embodiments, the chosen target may be associated with the largest number of positive reports represented by the filtered plurality of representations. The target may be associated with a highest rating or highest aggregate rating of all the targets associated with the filtered plurality of representations.

Some embodiments of the present invention may include an act of sorting the filtered plurality of representations. In some embodiments, for example, sorting may be performed, for example, based on a degree of a recommendation (e.g., the highest and/or lowest ratings may be placed first in a list of reports). In some embodiments, for example, sorting may be performed, for example, based on an originator's social distance from a user (e.g., reports generated by originators most closely related to the user in a social network may be listed before reports from other members of the social network).

In some embodiments of the present invention, a representation of the filtered plurality of reports may include a representation of all of the plurality of reports (or all of the plurality of reports about a target or target type). In such embodiments, the representation of the filtered plurality of reports may include a group identifier for each report. The group identifier may indicate which reports were originated by member of the group (e.g., a star in a website representation of the reports may be placed next to each report originated by a member of the group.) In some embodiments, the group identifier may include a social distance identifier. The social distance identifier may indicate a social distance between a user of an embodiment and the originator of a respective report (e.g., five stars may be placed next to reports originated by the closes members of a social network, few stars may be placed next to further members of the social network, and no stars may be placed next to reports not originated by members of the social network). In some embodiments, a group identifier or social network identifier may include a change to a font (e.g., bolded, underlined, or larger fonts may indicate an originator that is a member of the group).

Example in the Delivery Domain

As one example of the present invention in operation, consider choosing a delivery service provider (e.g., UPS) from a market website (e.g., eBay). The market website may allow a plurality of merchants to sell products to a plurality of customers over the Internet. A plurality of third-party delivery service providers may offer the service of delivering products from the merchants to the customers.

In one example of such a website, a customer may choose which delivery service provider to use. After delivery is complete, the customer may be asked to provide a report regarding the delivery service (e.g., a rating, a written description, a recommendation for or against, etc.). Additionally or alternatively, the time when the order is placed with the delivery service provider and the time when the product is delivered to the customer may be monitored and a report (e.g., with the customer as the originator) may be generated indicating the time taken to provide the delivery service. In some implementations, the customer's own choice of using one delivery service provider may be monitored and a report may be generated indicating that choice with the customer identified as an originator.

Customers using such a market website may be able to view previous customer reports before choosing which delivery service provider to choose. To narrow the reports to those that may be most relevant or important to these customers, the reports may be filtered based on some desired group (e.g., a social network) so that only those reports that are associated with originators in the group are viewed. In some implementations, the website may recommend one delivery service provider that has been used most by members of the group, recommended most by members of the group, and/or received a highest aggregate rating from members of the group. In some embodiments, the delivery service provider may be chosen automatically based on the reports of users in the group.

In some embodiments, the market website may maintain a social network as described above by responding to user input, such a requests to add members to a social network. In some embodiments, the social network or other group may be determined from a contact list in an email program. In such embodiments, the reports stored by the system may be filtered to only those that are associated with an email address or other contact identifier in the contact list.

In other embodiments, a merchant may choose the delivery service provider rather than the customer. The merchant may receive filtered reports or recommendations based on users in the merchant's social network, a customer's social network or some third individuals social network or group (e.g., people that live near the customer, prior customers of the merchant) to make the choice of which delivery service provider to use. In some implementations, the website may choose the delivery service provider automatically.

Although the previous example was given in reference to reports regarding delivery service providers, it should be understood that the present invention is not limited to that set of reports. Rather, the present invention may be used with any product, merchant, service provider, and/or merchant.

Furthermore, although the previous example was described in terms of a single type of target (e.g., a delivery service provider), some embodiments may include multiple types of targets. The targets may include any combination of product, service, service providers, and/or merchants. To accommodate multiple types of targets, some embodiments of the present invention may track a target type. For example, a table such as the table illustrated in FIG. 3C illustrates one database table that may be used in tracking types of targets. In this example, two laptops and a delivery service provider are the types of targets that have been reported on.

In such an embodiment, the types of targets may be determined by a system administrator or an originator of a report. For example, an administrator or originator may choose a target type through a user interface when generating or receiving a report. The database entries may then be generated to associate the reports with a target type. The available types of targets that may be chosen through the user interface may be determined by the administrator.

In some embodiments, a request to filter the plurality of representations, as indicated in block 207 described above, may include a representation of a desired target type. The process of filtering reports, as indicated in block 209 and process 400, may exclude reports associated with target types that do not match the desired target type.

In some embodiments, target types may be further divided into subtypes. For example, a main type may include computers, and a subtype may include laptop computers. In such embodiments, users may request reports at a desired level of specificity (e.g., reports for a specific product, reports for a specific subtype of product, or reports for a broad type of product). In some embodiments, any number of subtype levels may be included.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

Guidelines for Interpreting the Present Application

The following sections provide a guide to interpreting the present application.

Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining Forms of Sentences Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth☐, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

The invention claimed is:

1. An apparatus comprising:
    at least one processor; and
    at least one memory having instructions stored thereon which, when executed by the at least one processor, control to:
    detect, via a communication network, from a plurality of remote devices, a plurality of first orders;
    facilitate delivery for each of the plurality of first orders using a plurality of delivery service providers;
    monitor delivery timing for each of the plurality of first orders;
    automatically generate first evaluation reports for each of the delivery services providers based on the monitored delivery timing, wherein each of the first evaluation reports includes data that defines a positive review or a negative review based on the monitored delivery timing meeting an expected delivery time;
    collect, via the communication network, from the remote devices, second evaluation reports about a quality of experience for each of the plurality of delivery service providers, in which each of the first and second evaluation reports is associated with a respective originator, and in which each of the second evaluation reports includes data that defines a positive review or a negative review about the quality of experience of the respective delivery service provider of the plurality of delivery service providers;

store, in a database, the first evaluation reports and the second evaluation reports such that the first and second evaluation reports are associated with the respective originators;

determine, in response to accessing a representation of a group in the database, members of the group;

retrieve, via the communication network, from a first remote device of the remote devices, a contact list corresponding to a social network of a first member of the group, wherein at least one member of the group is a member of the contact list;

add one or more chosen reporters to the group in response to a request from one or more members of the group, wherein the one or more chosen reporters are outside of the social network of the first member;

filter, in response to a request from the first member, via access to the database, the first evaluation reports and the second evaluation reports into a set of evaluation reports, by excluding evaluation reports other than from respective originators who are either (i) members of the contact list within a desired geographic location, (ii) the one or more chosen reporters, or (iii) other members of the group within a social distance limit;

wherein each report of the set of evaluation reports includes a group identifier, and the group identifier is associated with a range of stars;

assign a quantity of stars within the range of stars to the group identifier for each report of the set of evaluation reports, wherein a maximum quantity of stars within the range of stars is assigned to closest members of the social network of the first member, a lesser quantity of stars within the range of stars is assigned to relatively further members of the social network of the first member, and a quantity of zero stars within the range of stars is assigned to reports not originated by members of the social network of the first member;

sort the set of evaluation reports based on a degree of recommendation;

compute a single recommended delivery service provider, from the plurality of delivery service providers, based on a quantity of positive reports in the set of evaluation reports;

in response to computing the single recommended delivery service provider, render, on a display screen of the first remote device, a graphical user interface indicating the single recommended delivery service provider, indicating at least a portion of the set of evaluation reports sorted based on the degree of recommendation, and indicating the quantity of stars assigned to each report of the portion of the set of evaluation reports; and purchase on behalf of the first member a service provided by the single recommended delivery service provider in response to user interaction with the graphical user interface subsequent to the indicating the single recommended delivery service provider.

2. The apparatus of claim 1, in which the second evaluation reports each include a written description of the quality of experience with the respective delivery service provider of the plurality of delivery service providers.

3. The apparatus of claim 1, in which the second evaluation reports each include a ranking of the quality of experience with the respective delivery service provider of the plurality of delivery service providers.

4. A method comprising:

controlling, by at least one processor:

detecting, via a communication network, from a plurality of remote devices, a plurality of first orders;

facilitating delivery for each of the plurality of first orders using a plurality of delivery service providers;

monitoring delivery timing for each of the plurality of first orders;

automatically generating first evaluation reports for each of the delivery services providers based on the monitored delivery timing, wherein each of the first evaluation reports includes data that defines a positive review or a negative review based on the monitored delivery timing meeting an expected delivery time;

collecting, via the communication network, from the remote devices, second evaluation reports about a quality of experience for each of the plurality of delivery service providers, in which each of the first and second evaluation reports is associated with a respective originator, and in which each of the second evaluation reports includes data that defines a positive review or a negative review about the quality of experience of the respective delivery service provider of the plurality of delivery service providers;

storing, in a database, the first evaluation reports and the second evaluation reports such that the first and second evaluation reports are associated with the respective originators;

determining, in response to accessing a representation of a group in the database, members of the group;

retrieving, via the communication network, from a first remote device of the remote devices, a contact list corresponding to a social network of a first member of the group, wherein at least one member of the group is a member of the contact list;

adding one or more chosen reporters to the group in response to a request from one or more members of the group, wherein the one or more chosen reporters are outside of the social network of the first member;

filtering in response to a request from the first member, via access to the database, the first evaluation reports and the second evaluation reports into a set of evaluation reports, by excluding evaluation reports other than from respective originators who are either (i) members of the contact list within a desired geographic location, (ii) the one or more chosen reporters, or (iii) other members of the group within a social distance limit;

wherein each report of the set of evaluation reports includes a group identifier, and the group identifier is associated with a range of stars;

assigning a quantity of stars within the range of stars to the group identifier for each report of the set of evaluation reports, wherein a maximum quantity of stars within the range of stars is assigned to closest members of the social network of the first member, a lesser quantity of stars within the range of stars is assigned to relatively further members of the social network of the first member, and a quantity of zero stars within the range of stars is assigned to reports not originated by members of the social network of the first member;

sorting the evaluation reports based on a degree of recommendation;

computing a single recommended delivery service provider, from the plurality of delivery service providers, based on a quantity of positive reports in the set of evaluation reports;

in response to computing the single recommended delivery service provider, rendering, on a display screen of the first remote device, a graphical user interface indicating the single recommended delivery service provider, indicating at least a portion of the set of evaluation reports sorted based on the degree of recommendation, and indicating the quantity of stars assigned to each report of the portion of the set of evaluation reports; and purchasing on behalf of the first member a service provided by the single recommended delivery service provider in response to user interaction with the graphical user interface subsequent to the indicating the single recommended delivery service provider.

5. The method of claim 4, in which the second evaluation reports each include a written description of the quality of experience with the respective delivery service provider of the plurality of delivery service providers.

6. The method of claim 4, in which the second evaluation reports each include a ranking of the quality of experience with the respective delivery service provider of the plurality of delivery service providers.

7. A machine-readable non-transitory medium having instructions stored thereon, in which the instructions are configured to, when executed by at least one processor, control to:

detect, via a communication network, from a plurality of remote devices, a plurality of first orders;

facilitate delivery for each of the plurality of first orders using a plurality of delivery service providers;

monitor delivery timing for each of the plurality of first orders;

automatically generate first evaluation reports for each of the delivery services providers based on the monitored delivery timing, wherein each of the first evaluation reports includes data that defines a positive review or a negative review based on the monitored delivery timing meeting an expected delivery time;

collect, via the communication network, from the remote devices, second evaluation reports about a quality of experience for each of the plurality of delivery service providers, in which each first and second evaluation reports is associated with a respective originator, and in which each of the second evaluation reports includes data that defines a positive review or a negative review about the quality of experience of the respective delivery service provider of the plurality of delivery service providers;

store, in a database, the first evaluation reports and the second evaluation reports such that the first and second evaluation reports are associated with the respective originators;

determining, in response to accessing a representation of a group in the database, members of the group;

retrieve, via the communication network, from a first remote device of the remote devices, a contact list corresponding to a social network of a first member of the group, wherein at least one member of the group is a member of the contact list;

add one or more chosen reporters to the group in response to a request from one or more members of the group, wherein the one or more chosen reporters are outside of the social network of the first member;

filter in response to a request from the first member, via access to the database, the first evaluation reports and the second evaluation reports into a set of evaluation reports, by excluding evaluation reports other than from respective originators who are either (i) members of the contact list within a desired geographic location, (ii) the one or more chosen reporters, or (iii) other members of the group within a social distance limit;

wherein each report of the set of evaluation reports includes a group identifier, and the group identifier is associated with a range of stars;

assign a quantity of stars within the range of stars to the group identifier for each report of the set of evaluation reports, wherein a maximum quantity of stars within the range of stars is assigned to closest members of the social network of the first member, a lesser quantity of stars within the range of stars is assigned to relatively further members of the social network of the first member, and a quantity of zero stars within the range of stars is assigned to reports not originated by members of the social network of the first member;

sort the set of evaluation reports based on a degree of recommendation;

compute a single recommended delivery service provider from the plurality of delivery service providers, based on a quantity of positive reports in the set of evaluation reports;

in response to computing the single recommended delivery service provider, render, on a display screen of the first remote device, a graphical user interface indicating the single recommended delivery service provider, indicating at least a portion of the set of evaluation reports sorted based on the degree of recommendation, and indicating the quantity of stars assigned to each report of the portion of the set of evaluation reports; and purchase on behalf of the first member a service provided by the single recommended delivery service provider in response to user interaction with the graphical user interface subsequent to the indicating the single recommended delivery service provider.

8. The machine-readable non-transitory medium of claim 7, in which the second evaluation reports each include a written description of the quality of experience with the respective delivery service provider of the plurality of delivery service providers.

9. The machine-readable non-transitory medium of claim 7, in which the second evaluation reports each include a ranking of the quality of experience with the respective delivery service provider of the plurality of delivery service providers.

10. The method of claim 6, wherein the filtering includes excluding from the set of evaluation reports any of the first and second evaluation reports associated with a respective negative review.

* * * * *